US012554983B2

(12) United States Patent
Tao et al.

(10) Patent No.: US 12,554,983 B2
(45) Date of Patent: Feb. 17, 2026

(54) MACHINE LEARNING-BASED SYSTEMS AND METHODS FOR IDENTIFYING AND RESOLVING CONTENT ANOMALIES IN A TARGET DIGITAL ARTIFACT

(71) Applicant: Gruve Tech Inc., Wilmington, DE (US)

(72) Inventors: Meng Tao, San Francisco, CA (US); Yi Qiao, Saratoga, CA (US)

(73) Assignee: Gruve Tech Inc., Wilmington, DE (US)

( * ) Notice: Subject to any disclaimer, the term of this patent is extended or adjusted under 35 U.S.C. 154(b) by 0 days.

(21) Appl. No.: 17/990,242

(22) Filed: Nov. 18, 2022

(65) Prior Publication Data

US 2024/0169195 A1    May 23, 2024

(51) Int. Cl.
*G06N 3/08*    (2023.01)
*H04L 9/40*    (2022.01)

(52) U.S. Cl.
CPC .......... *G06N 3/08* (2013.01); *H04L 63/1425* (2013.01)

(58) Field of Classification Search
CPC .............................. G06N 3/08; H04L 63/1425
See application file for complete search history.

(56) References Cited

U.S. PATENT DOCUMENTS

| | | | | |
|---|---|---|---|---|
| 7,814,089 B1* | 10/2010 | Skrenta | ................. | G06F 16/951 715/229 |
| 9,372,858 B1* | 6/2016 | Vagell | ................... | G06F 40/166 |
| 9,881,010 B1* | 1/2018 | Gubin | ..................... | G06F 16/93 |
| 11,244,110 B2* | 2/2022 | Herr | ....................... | G06F 40/253 |
| 11,587,652 B1* | 2/2023 | Willis | ..................... | G06F 21/64 |
| 2015/0309986 A1* | 10/2015 | Brav | ........................ | G06F 16/38 707/739 |
| 2016/0055132 A1* | 2/2016 | Garrison | ............... | G06F 16/958 706/12 |
| 2017/0220535 A1* | 8/2017 | Olsen | .................... | G06F 40/117 |
| 2018/0268506 A1* | 9/2018 | Wodetzki | ................ | G06F 15/76 |

(Continued)

OTHER PUBLICATIONS

Chenthamarakshan et al. (Measuring Compliance and Deviations in A Template-Based Service Contract Development Process, Jul. 2010, pp. 289-296) (Year: 2010).*

*Primary Examiner* — George Giroux
(74) *Attorney, Agent, or Firm* — HORIZON IP PTE LTD.

(57) ABSTRACT

A machine learning-based method for accelerating a detection and disposition of content anomalies in a target digital artifact includes identifying, by one or more computers, a digital artifact underpinning a digital artifact assessment request; detecting, via the one or more computers, a plurality of content deviations in the target digital artifact based on a context-sensitive artifact assessment protocol obtained from the context-sensitive artifact assessment protocol repository; identifying, via a digital artifact assessment user interface, a sequence of one or more inputs corresponding to a rejection of a first subset of the plurality of content deviations; and based on identifying the rejection of the first subset of the plurality of content deviations: computing, via the one or more computers, a system-generated adaptation proposal for each content deviation underpinning the first subset of the plurality of content deviations based on machine learning-derived policies underpinning the context-sensitive artifact assessment protocol.

16 Claims, 16 Drawing Sheets

(56) References Cited

U.S. PATENT DOCUMENTS

| | | | | |
|---|---|---|---|---|
| 2018/0357562 A1* | 12/2018 | Hofman | .................. | G06N 5/022 |
| 2019/0138611 A1* | 5/2019 | Gines Marin | ......... | G06F 16/337 |
| 2020/0293606 A1* | 9/2020 | Nelson | .................. | G06F 40/117 |
| 2020/0302011 A1* | 9/2020 | Mishra | .................. | G06F 40/242 |
| 2022/0215158 A1* | 7/2022 | Emmart | .................. | G06F 40/40 |
| 2022/0296923 A1* | 9/2022 | Peltola | .................. | A61N 5/103 |

\* cited by examiner

FIGURE 3H

MACHINE LEARNING-BASED SYSTEMS AND METHODS FOR IDENTIFYING AND RESOLVING CONTENT ANOMALIES IN A TARGET DIGITAL ARTIFACT

TECHNICAL FIELD

This invention relates generally to the computer-based learning field, and more specifically, to new and useful systems and methods for intelligently identifying and resolving content anomalies associated with a digital artifact.

BACKGROUND

Conventional document review workflows are highly manual and inefficient. Typically, for a document in need of review, a human expert will read such document, subjectively determine if any portion of the document does not reflect their interests, and, in turn, manually revise such portions to align with their interests. This slow and tedious process is not only time-intensive, error-prone, and expensive, but also fails to scale in instances where hundreds (or thousands) of documents need review.

Accordingly, there is a need for new and useful systems and methods that automatically identify content anomalies associated with a digital artifact and resolve such anomalies. The embodiments of the present application, described herein, provide technical solutions that at least address the needs described above, as well as the deficiencies of the state of the art.

BRIEF SUMMARY OF THE INVENTION(S)

Figure 1:
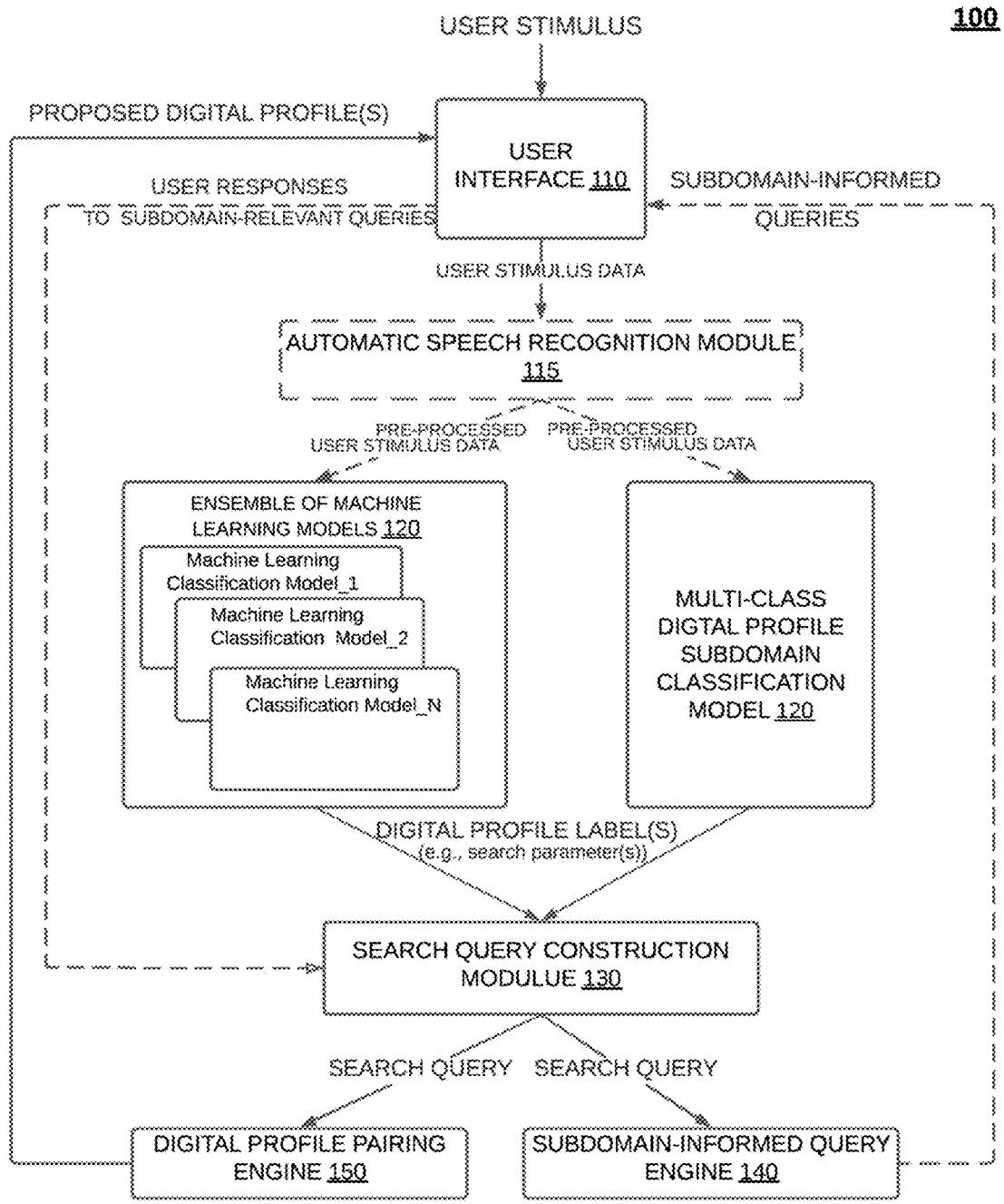
FIG. 1 illustrates a schematic representation of a system 100 in accordance with one or more embodiments of the present application.

In some embodiments, a machine learning-based method for accelerating a detection and disposition of content anomalies in a target digital artifact includes: identifying, by one or more computers, a digital artifact underpinning a digital artifact assessment request; classifying the digital artifact to a distinct artifact category of a plurality of possible artifact categories based on features extracted from the digital artifact; obtaining, from a context-sensitive artifact assessment protocol repository, a context-sensitive artifact assessment protocol digitally mapped to the distinct artifact category; detecting, via the one or more computers, a plurality of content deviations in the target digital artifact based on the context-sensitive artifact assessment protocol obtained from the context-sensitive artifact assessment protocol repository; identifying, via a digital artifact assessment user interface, a sequence of one or more inputs corresponding to an acceptance of a first subset of the plurality of content deviations and a rejection of a second subset of the plurality of content deviations; based on identifying the acceptance of the first subset of the plurality of content deviations: (A) digitally accepting the first subset of content deviations in the digital artifact; and (B) graphically indicating, to a subscriber, that the first subset of the plurality of content deviations have been digitally accepted based on a predefined typographical presentation scheme; and based on identifying the rejection of the second subset of the plurality of content deviations: (I) digitally rejecting the second subset of the plurality of content deviations in the target digital artifact; (II) graphically indicating, to the subscriber, that the second subset of the plurality of content deviations have been digitally rejected based on the predefined typographical presentation scheme; (III) computing, via the one or more computers, a system-generated adaptation proposal for each content deviation underpinning the second subset of the plurality of content deviations based on machine learning-derived policies underpinning the context-sensitive artifact assessment protocol; and (IV) graphically indicating, to the subscriber, the system-generated adaptation proposal computed for each content deviation underpinning the second subset of the plurality of content deviations.

In some embodiments, graphically indicating the system-generated adaptation proposal computed for a subject content deviation includes: displaying, to the subscriber, an adaptation discovery user interface element corresponding to the system-generated adaptation proposal, wherein: (a) the adaptation discovery user interface element includes a textual representation of the system-generated adaptation proposal, (b) the adaptation discovery user interface element includes a first selectable option that, when selected, causes the subject content deviation to be replaced with the system-generated adaptation proposal, and (c) the adaptation discovery user interface element includes a second selectable option that, when selected, rejects the system-generated adaptation proposal.

In some embodiments, rejecting the system-generated adaptation proposal includes forgoing replacing the subject content deviation with the system-generated adaptation proposal. In some embodiments, the method includes identifying, by one or more computers, a second input selecting the second selectable option; based on identifying the second input: computing, via one or more computers, one or more additional system-generated adaptation proposals for the subject content deviation based on the machine learning-derived policies underpinning the context-sensitive artifact assessment protocol; and sequentially displaying, to the subscriber, the one or more additional system-generated adaptation proposals until the subscriber accepts one of the one or more additional system-generated adaptation proposals; and based on the subscriber accepting one of the one or more additional system-generated adaptation proposals: digitally replacing the subject content deviation with the one of the one or more additional system-generated proposals in accordance with the predefined typographical presentation scheme.

In some embodiments, the method includes constructing the context-sensitive artifact assessment protocol repository, wherein constructing the context-sensitive artifact assessment protocol repository includes: constructing a plurality of context-sensitive artifact assessment protocols based on a plurality of distinct baseline digital artifacts associated with the subscriber; and embedding the plurality of context-sensitive artifact assessment protocols in the context-sensitive artifact assessment protocol repository.

In some embodiments, constructing the plurality of context-sensitive artifact assessment protocols includes constructing the context-sensitive artifact assessment protocol, and constructing the context-sensitive artifact assessment protocol includes: identifying, via one or computers, a baseline digital artifact for the distinct artifact category; identifying, via one or more automated search heuristics, each provision underpinning in the baseline digital artifact; identifying, via the one or more automated search heuristics, a contract condition underpinning each provision in the baseline digital artifact; identifying, via one or more computers, one or more alternative contract conditions for each provision defined in the baseline digital artifact based on an evaluation of a plurality of distinct instances of the baseline digital artifact; and embedding, in the context-sensitive artifact assessment protocol, a machine learning-derived policy for each provision underpinning the baseline digital artifact.

In some embodiments, a machine learning-derived policy for a subject provision defines a subscriber preferred position associated with the subject provision, the machine learning-derived policy for the subject provision defines one or more subscriber-accepted alternative positions associated with the subject provision, the subscriber preferred position corresponds to the contract condition identified as underpinning the subject provision in the baseline digital artifact, and the one or more subscriber-accepted alternative positions correspond to the one or more alternative contract conditions identified for the subject provision in the plurality of distinct instances of the baseline digital artifact.

In some embodiments, detecting the plurality of content deviations based on the context-sensitive artifact assessment protocol includes: (a) detecting one or more adversarial conditions in the target digital artifact based on machine learning-derived policies underpinning the context-sensitive artifact assessment protocol.

In some embodiments, detecting the plurality of content deviations based on the context-sensitive artifact assessment protocol further includes: (b) detecting that one or more expected pieces of content is missing from the target digital artifact based on the machine learning-derived policies underpinning the context-sensitive artifact assessment protocol.

In some embodiments, a machine learning-based method for accelerating a detection and disposition of content anomalies in a target digital artifact includes: identifying, by one or more computers, a digital artifact underpinning a digital artifact assessment request; classifying the digital artifact to a distinct artifact category of a plurality of possible artifact categories based on features extracted from the digital artifact; obtaining, from a context-sensitive artifact assessment protocol repository, a context-sensitive artifact assessment protocol digitally mapped to the distinct artifact category; detecting, via the one or more computers, a plurality of content deviations in the target digital artifact based on the context-sensitive artifact assessment protocol obtained from the context-sensitive artifact assessment protocol repository; identifying, via a digital artifact assessment user interface, a sequence of one or more inputs corresponding to a rejection of a first subset of the plurality of content deviations; and based on identifying the rejection of the first subset of the plurality of content deviations: (I) digitally rejecting the first subset of the plurality of content deviations in the target digital artifact; (II) graphically indicating, to the subscriber, that the first subset of the plurality of content deviations have been digitally rejected based on a predefined typographical presentation scheme; (III) computing, via the one or more computers, a system-generated adaptation proposal for each content deviation underpinning the first subset of the plurality of content deviations based on machine learning-derived policies underpinning the context-sensitive artifact assessment protocol; and (IV) graphically indicating, to the subscriber, the system-generated adaptation proposal computed for each content deviation underpinning the second subset of the plurality of content deviations.

In some embodiments, the target digital artifact is transactional artifact (e.g., a legal contract or the like), the target digital artifact is an instance of a baseline digital artifact associated with the subscriber, the target digital artifact includes adaptations made by an external party, and detecting the plurality of content deviations in the target digital artifact includes: identifying a plurality of third-party adaptations in the target digital artifact; for each third-party adaptation of the plurality of third-party adaptations: identifying a clause in the target digital artifact corresponding to each third-party adaptation; identifying a machine learning-based policy underpinning the context-sensitive artifact assessment protocol that corresponds to the clause; determining that a subject third-party adaptation is not adversarial if the machine learning-based policy indicates that the subject third-party adaptation is a preferred position of the clause or if the machine learning-based policy indicates that the subject third-party adaptation is an alternative position of the clause; and determining that the subject third-party adaptation is adversarial if the machine learning-based policy does not indicate that the subject third-party adaptation is one of the preferred positions associated with the clause or one of the alternative positions associated with the clause.

In some embodiments, detecting the plurality of content deviations in the target digital artifact includes: (i) detecting one or more adversarial conditions in the target digital artifact based on the machine learning-derived policies underpinning the context-sensitive artifact assessment protocol; and (ii) detecting one or more expected pieces of content missing from the target digital artifact based on the machine learning-derived policies underpinning the context-sensitive artifact assessment protocol.

In some embodiments, the digital artifact assessment request is identified based on the subscriber uploading the target digital artifact to a digital artifact assessment service; the context-sensitive artifact assessment protocol repository includes a plurality of context-sensitive artifact assessment protocols; each of the plurality of context-sensitive artifact assessment protocols is digitally associated with a distinct artifact category; and each of the plurality of context-sensitive artifact assessment protocols comprise a plurality of machine learning-derived policies that include computer-readable data for assessing a digital artifact associated with the distinct artifact category.

In some embodiments, a machine learning-based method for accelerating a detection and disposition of content anomalies in a target digital artifact includes: identifying a digital artifact assessment request from a subscriber, wherein the digital artifact assessment request (a) comprises a target digital artifact and (b) is identified based on the subscriber uploading the target digital artifact to a digital artifact assessment service; based on identifying the digital artifact assessment request: computing an artifact classification inference for the target digital artifact based on an input of features extracted from the target digital artifact, wherein the artifact classification inference includes a predicted likelihood that the target digital artifact classifies to an artifact category of a plurality of distinct artifact categories; searching a context-sensitive artifact assessment protocol repository for a context-sensitive artifact assessment protocol that is digitally associated with the artifact category based on the artifact classification inference based on the artifact classification inference; detecting, based on the context-sensitive artifact assessment protocol, a plurality of content deviations in the target digital artifact, wherein the detecting includes: (i) detecting one or more adversarial conditions in the target digital artifact based on machine learning-derived policies underpinning the context-sensitive artifact assessment protocol; and (ii) detecting one or more expected pieces of content missing from the target digital artifact based on the machine learning-derived policies underpinning the context-sensitive artifact assessment protocol; and generating a digital artifact assessment user interface based on the plurality of content deviations detected in the target digital artifact, wherein generating the digital artifact assessment user interface includes: (1) generating a digital representation of the target digital artifact, wherein the digital representation of the target digital artifact is scrollable to display different portions of the target digital artifact; and (2) generating a content anomaly user interface element for each content deviation detected in the target digital artifact, wherein the content anomaly user interface element includes a first selectable option for accepting a target content deviation and a second selectable option for denying the target content deviation; identifying a sequence of subscriber inputs corresponding to an acceptance of a first subset of content deviations of the plurality of content deviations and a denial of a second subset of content deviations of the plurality of content deviations; based on identifying the acceptance of the first subset of content deviations: (A) digitally accepting the first subset of content deviations in the target digital artifact; and (B) graphically indicating, in the digital artifact assessment user interface, that the first subset of content deviations have been digitally accepted based on a predefined typographical presentation scheme; and based on identifying the denial of the second subset of content deviations: (I) digitally rejecting the second subset of content deviation in the target digital artifact; (II) graphically indicating, in the digital artifact assessment user interface, that the second subset of content deviations have been digitally rejected based on the predefined typographical presentation scheme; (III) computing a system-generated adaptation proposal for each content deviation underpinning the second subset of content deviations based on the machine learning-derived policies underpinning the context-sensitive artifact assessment protocol; (IV) generating an adaptation discovery user interface element for each content deviation underpinning the second subset of content deviations, wherein the adaptation discovery user interface element, once generated, at least includes: (III-a) a textual representation of the system-generated adaptation proposal computed for a subject content deviation; (III-b) a first respective selectable option for accepting the system-generated adaptation proposal that, when selected, causes the system-generated adaptation proposal to be digitally inserted into the target digital artifact according to the predefined typographical presentation scheme; and (M-c) a second respective selectable option for rejecting the system-generated adaptation proposal that, when selected, causes one or more additional system-generated adaptation proposals to be generated for the subject content deviation, wherein the one or more additional system-generated adaptation proposals are generated based on the machine learning-derived policies underpinning the context-sensitive artifact assessment protocol.

In some embodiments, the target digital artifact is a legal contract, the artifact classification inference is computed via a machine learning-based artifact classifier, the machine learning-based artifact classifier is configured to classify the target digital artifact to one of the plurality of distinct artifact categories, and classifying the target digital artifact to one of the plurality of distinct artifact categories includes classifying the target digital to one of a licensing agreement, a non-disclosure agreement, a master services agreement, and a supplier agreement.

In some embodiments, the target digital artifact is a legal contract, the target digital artifact is an instance of a baseline digital artifact associated with the subscriber, the target digital artifact includes adaptations made by an external party, and detecting the one or more adversarial conditions in the target digital artifact includes: identifying a plurality of third-party adaptations in the target digital artifact; for each third-party adaptation of the plurality of third-party adaptations: identifying a clause in the target digital artifact comprising a subject third-party adaptation; identifying a machine learning-based policy underpinning the context-sensitive artifact assessment protocol that corresponds to the clause; determining that the subject third-party adaptation is not adversarial if the machine learning-based policy indicates that the subject third-party adaptation is a preferred position of the clause; and determining that the subject third-party adaptation is adversarial if the machine learning-based policy does not indicate that the subject third-party adaptation is one of the preferred positions associated with the clause.

In some embodiments, detecting the one or more adversarial conditions in the target digital artifact further includes: for each third-party adaptation of the plurality of third-party adaptations: determining that the subject third-party adaptation is not adversarial if the machine learning-based policy indicates that the subject third-party adaptation is an alternative position of the clause; and determining that the subject third-party adaptation is adversarial if the machine learning-based policy does not indicate the subject third-party adaptation is one of the alternative positions associated with the clause.

In some embodiments, the method includes: identifying a second sequence of subscriber inputs corresponding to an acceptance of at least one of the additional system-generated proposals generated for each of the content deviation underpinning the second subset of content deviations; based on identifying the acceptance of at least one of the additional system-generated proposals: (A) digitally inserting the at least one of the additional system-generated proposals in the target digital artifact (B) graphically indicating, in the digital artifact assessment user interface, that the at least one of the additional system-generated has been digitally inserted based on the predefined typographical presentation scheme; and outputting a succeeding instance of the target digital artifact based on (1) digitally inserting the at least one of the additional system-generated proposals and (2) digitally accepting the first subset of content deviations.

In some embodiments, the method includes constructing the context-sensitive artifact assessment protocol repository, wherein constructing the context-sensitive artifact assessment protocol repository includes: constructing a plurality of context-sensitive artifact assessment protocols based on identifying a plurality of distinct baseline digital artifacts associated with the subscriber; and embedding the plurality of context-sensitive artifact assessment protocols in the context-sensitive artifact assessment protocol repository.

In some embodiments, the method includes displaying the digital artifact assessment user interface, wherein displaying the digital artifact assessment user interface includes displaying the content anomaly user interface element generated for a subject content deviation in association with a location of the subject content deviation in the digital representation of the target digital artifact.

In some embodiments, the features extracted from the target digital artifact at least include: (1) a file name of the target digital artifact, (2) a title of the target digital artifact, (3) each section defined in the target digital artifact, (4) each clause defined in the target digital artifact, and (5) each provision defined in the target digital artifact.

In some embodiments, a computer-implemented method for accelerating digital document handling and/or disposal includes: sourcing, from a subscriber, a document corpus comprising a plurality of distinct samples of digital documents; defining a position corpus comprising a plurality of distinct position features based on extracting position-related features from a plurality of distinct content sections of each of the plurality of distinct samples of digital documents; identifying one or more adaptation stances for each distinct content section types of the plurality of distinct content sections based on the position corpus, wherein an adaptation stance relates to an expected adaptation behavior by the subscriber when editing a subject content section of a digital document; constructing an adaptation matrix based on the identification of the one or more adaptation stances for each distinct content section types of the plurality of distinct content sections, wherein constructing the adaptation matrix includes: (a) deriving an adaptation hierarchy of a plurality of adaptation stances for each distinct content section type of the plurality of distinct content sections for which a plurality of adaptation stances is identified, (b) creating an adaptation entry in digital association with for each of the one or more adaptation stances associated with a respective distinct content section type for each distinct content section type of the distinct content sections; (c) digital document adaptation logic that informs a recommendation of an adaptation for a subject document section of a target document; identifying a target digital document having a plurality of content sections; generating one or more adaptation inferences for one or more of the plurality of content sections of the target digital document based on the adaptation matrix; and displaying, via a graphical user interface, a distinct graphical object for each of one or more adaptation proposals in a hierarchical order proximate to a target content section of the plurality of content sections based on the one or more adaptation inferences for accelerating a disposal of the target digital document.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

1. System for Machine Learning-Based Pairings of User Stimuli-to-Digital Profile Data As shown in FIG. 1, a system 100 for machine learning-based pairing of user stimuli-to-digital profiles may include a user interface 110, a machine learning-based classification system 120, a search query construction module 130, a subdomain-informed query engine 140, and a digital profile pairing engine 150. The system 100 may optionally include an automatic speech recognition module 115. The system 100 may sometimes be referred to herein as a service provider discovery service 100, a user content-to-digital account pairing service 100, or an online digital profile discovery service 100. As described in more detail herein, the service provider discovery service 100 may enable a discovery of any suitable online digital profile data and/or related online digital profile content for a plurality of distinct service provider digital profiles including, but not limited to, lawyer-service provider profiles, health care-service provider profiles, financial services-service provider profiles, insurance services-service provider profile, and/or the like.

In one or more embodiments, each module or engine of the system 100 may be implemented by one or more computing servers, one or more computing processors, or computing servers of a distributed computing system.

1.1 User Interface

In one or more embodiments, the system or service 100 may function to implement a user interface 110 that may preferably function to identify, collect, or ingest user input in any form. The user interface 110 may comprise a search interface that may be digitally accessible to online users over a computing medium, such as the world wide web or the internet. In one or more embodiments, the online users that may be interacting with the user interface 110 may input a user query in the form of text input, utterance input, and/or image input, and the user interface 110 may function to identify, collect, or ingest the user query.

In one or more embodiments, the user interface 110 may be implemented via any suitable computing device and/or from including, but not limited to, a mobile computing device, a personal computing device, a web-browser (having a website displayed therein), or the like. In some embodiments, the user interface 110 may function to implement one or more graphical user interface objects that may enable online users to continuously or periodically interact with the system 100 via the user interface 110. For instance, the user interface 110 may function to implement one or more text input fields into which online users may freely (e.g., manually) enter a user query (e.g., a user stimulus, a user input, or the like). In one or more embodiments, the user interface 100 may be enabled by a client application operating on a mobile computing device or the like. In such embodiments, the client application may be in operable communication with a client server of the system 100.

In one or more embodiments, based on identifying input of the user query at the user interface 110 (e.g., an Internet-accessible user interface), the user query data associated with the user query may be routed to a machine learning-based classification system and, in some embodiments, the user query data may be optionally routed to an automatic speech recognition module 115 that may convert the user query to text before routing the user query data to the machine learning-based classification system, if needed.

1.2 Machine Learning-Based Inference System|Machine Learning-Based Digital Profile Subdomain Inference System In one or more embodiments, the system 100 may function to implement a machine learning-based digital profile inference system 120 that may preferably function to generate inferences (e.g., classification inferences, including classification labels, entity or slot extraction inferences, and/or the like) (or classify) a target piece of user stimulus data (e.g., pre-processed user stimulus data) into one or more digital profile subdomain categories. The machine learning-based digital profile inference system 120, which may be sometimes referred to herein as a machine learning-based digital profile classification system 120 may be trained for interpreting the user query (e.g., human text), extracting features from the user query, and/or computing digital profile subdomain classification predictions based on the extracted features.

In one or more embodiments, an algorithmic structure underlying the machine learning-based digital profile classification system 120 may be a multi-class digital profile subdomain classification model or an ensemble of digital profile classification models. In one or more embodiments, the multi-class digital profile subdomain classification model may be algorithmically configured and/or specifically trained to generate predictions and/or inferences across a plurality of distinct categories or classes of distinct digital profiles. Accordingly, in such embodiments, the multi-class classification model may function to search unique combination of distinct classes of profiles based on search query input data. The multi-class digital profile subdomain classification model or the ensemble of digital profile classification models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

In one or more embodiments, the classification inference(s) of the machine learning-based digital profile classification system 120 may function to label a target piece of user stimulus data into one or more digital profile subdomain categories that may be used, as input, to a downstream module (e.g., the search query construction module) or engine (e.g., the digital profile pairing engine, the subdomain-informed query engine).

1.3 Search Query Construction Module

In one or more embodiments, the system 100 may function to implement a search query construction module 130 that may preferably function to construct one or more search queries for a target piece of user stimulus data. In one or more embodiments, the search query construction module may function to derive search parameters (for a target piece of user stimulus data) based on the machine learning-based classification label(s) or machine learning-based classification inference(s) predicted by the machine learning-based digital profile classification system 120. In one or more embodiments, the one or more search queries constructed by the search query construction module 130 may be in a machine-understandable format or syntax according to a prescribed search format or search syntax required by at least one of the digital profile pairing engine 150 or the subdomain-informed query engine 140.

In one or more embodiment, the search query construction module may function to construct a subdomain-informed search query that, when executed, may function to search a database comprising a corpus of subdomain-informed query data and match (or pair) the subdomain-informed search query to one or more subdomain-informed queries based on the search parameters of the subdomain-informed query. Additionally, or alternatively, in one or more embodiments, the search query construction module 130 may function to construct a digital profile search query (or digital account search query) that, when executed, may function to automatically search a database comprising a corpus of digital profile data and pair (or match) the digital profile search query to one or more digital profiles data sets (e.g., a plurality of service provider digital profiles, a plurality of digital accounts, or the like).

1.4 Subdomain-Informed Query Engine

In one or more embodiments, the system 100 may function to implement a subdomain-informed query engine 140 that may preferably function to selectively identify and pose one or more subdomain-informed queries to a target online user of the system or service 100. In one or more embodiments, the subdomain-informed query engine 140 may comprise a database comprising a corpus of subdomain-informed query data. In one or more embodiments, the corpus of subdomain-informed query data may be searched using the subdomain-informed search query (e.g., the search parameters of the subdomain-informed search query) constructed by the search query construction module 130. The corpus of subdomain-informed query data may include subdomain-informed queries indexed according to a corresponding digital profile subdomain classification label (e.g., the corpus of subdomain query data may include a plurality of distinct digital profile subdomain classification labels and a distinct set of subdomain-informed queries digitally mapped (or electronically linked) to each of the plurality of distinct digital profile subdomain classification labels).

In one or more embodiments, the subdomain-informed query engine 140 may function to selectively match or selectively pair a subset of subdomain-informed queries of the plurality of subdomain-informed queries of the corpus of subdomain-informed query data to a target subdomain-informed search query. Accordingly, in one or more embodiments, the subset of subdomain-informed query data may be posed to the target user via the user interface 110.

1.5 Digital Profile Pairing Engine

In one or more embodiments, the system 100 may function to implement a digital profile pairing engine 150 that may preferably function to selectively identify and display, via an Internet-accessible user interface 110, one or more digital profiles to a target online user of the system or service 100. In one or more embodiments, the digital profile pairing engine 150 may comprise a database comprising a corpus of digital profile data. In one or more embodiments, the corpus of digital profile data may be searched using the digital profile search query (e.g., the search parameters of the digital profile search query) constructed by the search query construction module 130. The corpus of digital profile data may include digital profiles or digital accounts indexed according to the one or more distinct digital profile subdomain classification labels described above.

In one or more embodiments, the digital profile pairing engine 150 may function to selectively match or selectively pair a subset of digital profiles (e.g., digital accounts) of the plurality of digital profiles (e.g., digital accounts) of the corpus of digital profile data to a target digital profile search query that may be displayed to a target user via the user interface 110.

Figure 2:
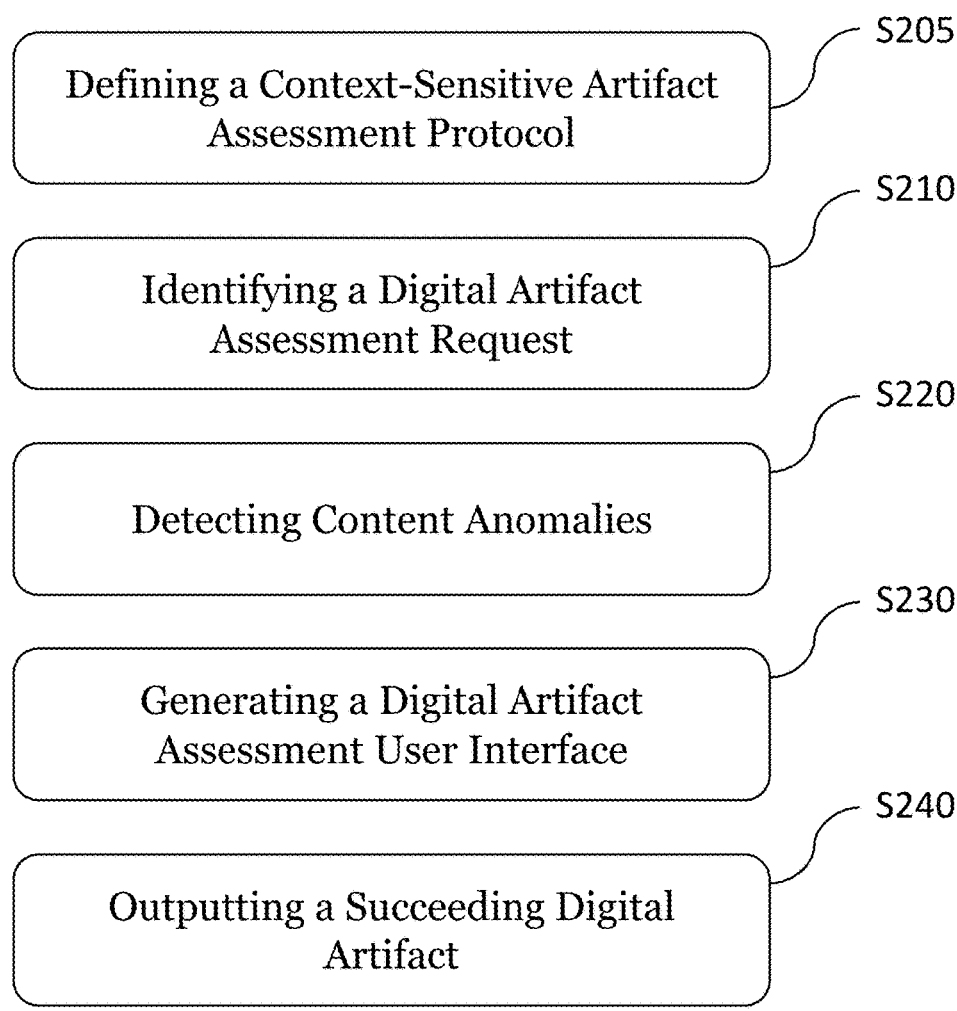
FIG. 2 illustrates an example method 200 in accordance with one or more embodiments of the present application.

2. Machine Learning-Based Method for Intelligently Identifying and Resolving Content Anomalies in a Target Digital Artifact As shown in FIG. 2, a machine learning-based method 200 for intelligently identifying and resolving content anomalies in a target digital artifact may include defining a context-sensitive artifact assessment protocol (S205), identifying a digital artifact assessment request (S210), detecting content anomalies (S220), generating a digital artifact assessment user interface (S230), and outputting a succeeding digital artifact (S240).

2.05 Defining a Context-Sensitive Artifact Assessment Protocol

S205, which includes defining a context-sensitive artifact assessment protocol, may function to automatically configure or construct a protocol for assessing digital artifacts. In some embodiments, the context-sensitive artifact assessment protocol, once constructed by S205, may comprise a set of machine learning-derived policies for programmatically assessing (textual) content underpinning a target digital artifact and/or may be configured to programmatically assess a particular kind/type of digital artifact.

For instance, in some embodiments, S205 may function to construct a context-sensitive artifact assessment protocol for automatically evaluating a particular kind of legal artifact (e.g., licensing agreements, non-disclosure agreements, supplier agreements, master service agreements, or the like). It shall be noted that the above example is not intended to be limiting and that S205 may function to establish additional or different context-sensitive artifact assessment protocols without departing from the scope of the inventions contemplated herein.

Identifying a Baseline Digital Artifact

In some embodiments, establishing a context-sensitive artifact assessment protocol may include identifying a baseline digital artifact (or a model digital artifact). The identified baseline digital artifact, in some embodiments, may relate to a standard document/template used by a subscriber and/or may include content desired by the subscriber (e.g., preferred clauses, provisions, positions, etc.). For instance, in a non-limiting example, if S205 is constructing a context-sensitive artifact assessment protocol for assessing a first type of digital artifact (e.g., nondisclosure agreements), S205 may function to identify a subscriber-defined document/template relating to the first type of digital artifact, such as a standard nondisclosure agreement normally used by the subscriber.

In some embodiments, identifying the baseline digital artifact may include obtaining (or collecting) the baseline digital artifact from a subscriber. In one example of such embodiments, obtaining (or collecting) the baseline digital artifact from the subscriber may include obtaining (or collecting) the baseline digital artifact via one or more graphical user interfaces (GUIs) that are specifically configured to allow a subscriber to upload one or more digital artifacts to a system/service implementing the method 200, may include obtaining (or collecting) the baseline digital artifact via one or more command line interfaces (CLIs) that are specifically configured to allow a subscriber to transmit one or more digital artifacts to a system/service implementing the method 200, may include obtaining (or collecting) the baseline digital artifact via one or more application programming interfaces (APIs) that are specifically configured to allow a subscriber to transfer one or more digital artifacts to a system/service implementing the method 200, and/or the like.

Extracting Target Content from the Baseline Digital Artifact

Furthermore, in some embodiments, establishing a context-sensitive artifact assessment protocol may include extracting target content from the baseline digital artifact. In one example of such embodiments, extracting target content from the baseline digital artifact may include extracting one or more (e.g., all) clauses defined in the baseline digital artifact, extracting one or more provisions defined in the baseline digital artifact, extracting one or more defined in the baseline digital artifact, and/or the like.

In some embodiments, to locate and extract the target content from the baseline digital artifact, S205 may function to implement an automated content search and extraction algorithm. The automated content search and extraction algorithm, in some embodiments, may function to search the baseline digital artifact for content satisfying pre-defined search rules (e.g., semantic search rules, formatting search rules, etc.) and, in turn, return data corresponding to each distinct piece of content that satisfied the pre-defined search rules (e.g., sentence data, paragraph data, clause data, section data, etc.).

In one example, the search rules of the automated search algorithm may include a section-based search rule that may be configured to search for section numbers within the baseline digital artifact. In some embodiments, the section-based search rule, when executed, may cause the automated content search and extraction algorithm to search for section numbers within the baseline digital artifact and return, as a search result, one or more paragraphs associated with each detected section number. It shall be noted that, in some embodiments, if multiple paragraphs within the baseline digital artifact refer to (or mention) a same section number, the automated content search and extraction algorithm may function to return the paragraph (e.g., clause), in the baseline digital artifact, that first mentions the section number.

Additionally, or alternatively, in a second example, the search rules of the automated search and extraction algorithm may include a token-based search rule that searches for tokens matching a pre-defined capitalization format (e.g., capitalized terms, words, etc.). In some embodiments, the token-based search rule, when executed, may cause the automated content search and extraction algorithm to search for tokens in the baseline digital artifact matching the pre-defined capitalization format and return, as a search result, a sentence (or paragraph) corresponding to each detected token. It shall be noted that, in some embodiments, if multiple equivalent recitations of a respective token is identified within the baseline digital artifact, the automated content search and extraction algorithm may return the sentence (or paragraph), in the baseline digital artifact, that first mentions the respective token.

It shall also be noted that the above examples are not intended to be limiting and that the automated content search algorithm may include fewer, additional, or different search rules without departing from the scope of the inventions contemplated herein. For instance, in yet another example, the semantic and/or formatting rules of the automated search algorithm may include a rule that searches for tokens that collectively match a pre-defined pattern/format, such as "[X] is defined as [ . . . ]" and/or "[X] refers to [ . . . ]" (where "[X]" and "[ . . . ]" relate to slots that may comprise any number of words).

Identifying an Intent for Each Extracted Piece of Content

Additionally, or alternatively, in some embodiments, establishing a context-sensitive artifact assessment protocol may include identifying one or more intents associated with each piece of content extracted from the baseline digital artifact. In one example of such embodiments, identifying one or more intents associated with each extracted piece of content may include identifying one or more conditions (e.g., positions) defined within each extracted piece of content.

In some embodiments, a condition (or a position) defined within an extracted piece of content, as generally referred to herein, may relate to an action that may need to be taken by a creator (e.g., executor) of the digital baseline artifact or by an external entity (e.g., a third party). Example positions/conditions that may be extracted from a target piece of content may include, but may not be limited, financial conditions, liability conditions, confidentiality conditions, termination conditions, dispute resolution conditions, damages conditions, jurisdiction conditions, and/or the like. It shall also be noted that, in some portions of the disclosure, a condition extracted from the baseline digital artifact may be referred to as a "preferred position."

In some implementations, to extract conditions/positions defined within each extracted piece of content, S205 may function to implement a context extraction machine learning model and/or an entity extraction machine learning model. In such implementations, S205 may function to sequentially, or in bulk, provide each piece of content extracted from the digital baseline artifact as input into the entity extraction machine learning model. In turn, the entity extraction machine learning model may function to generate, as output, a list of entities associated with each piece of content provided as input.

Similarly, the context extraction machine learning model may function to identify the context (e.g., provision type or category) associated with each sentence or paragraph that mentioned/defined a respective entity. For instance, in a non-limiting example, if the entity "3 years" was detected in the position/condition "This Agreement shall have a term of 3 years," the context extraction machine learning model may function to determine that this entity relates to a "Contract Duration" condition.

Identifying Alternative Conditions for Each Extracted Piece of Content

Additionally, or alternatively, in some embodiments, establishing a context-sensitive artifact assessment protocol may include identifying one or more contingency conditions (e.g., fallback conditions, alternative positions, etc.) for one or more of the preferred conditions extracted from the baseline digital artifact. In some embodiments, a contingency condition may relate to a condition/position that may be substituted with a preferred position/condition. For instance, in a non-limiting example, the condition "This Agreement shall continue in full force and effect for so long as Recipient continues to receive Confidential Information" may be associated with contingency conditions such as "This Agreement shall have a term of one year," "This Agreement shall have a term of two years," "This Agreement shall have a term of three years," and/or the like.

In one example, to identify contingency conditions for the one or more preferred conditions, S205 may function to identify (or source) different instances/versions of the baseline digital artifact. In some embodiments, these different instances/versions of the baseline digital artifact may include the same (or similar) sections, clauses, and/or provisions as the baseline digital, but may have one or more different conditions underpinning the same (or similar) sections, clauses, and/or provisions. Additionally, or alternatively, in some embodiments, identifying contingency conditions for the one or more preferred conditions may include—in analogous ways described with respect to the baseline digital artifact—extracting target content (e.g., sections, provisions, clauses) from the different instances/versions of the baseline digital artifact and/or may include identifying positions/conditions defined within each extracted piece of content.

Sourcing/Identifying Digital Artifacts Based on a Cohort Associated with the Subscriber Additionally, or alternatively, in some embodiments, establishing a context-sensitive artifact assessment protocol may include sourcing a corpus of digital artifacts from (or based on) entities in a same cohort as the subscriber. It shall be noted that, in some embodiments, such sourcing may enable the method 200 to construct a context-sensitive artifact assessment protocol without explicitly requiring the subscriber to provide a model/exemplary baseline digital artifact.

In some embodiments, S205 may function to source the corpus of digital artifacts based on the kind/type of context-sensitive artifact assessment protocol being constructed in S205. For instance, in a non-limiting example, if S205 is constructing a context-sensitive artifact assessment protocol relating to a first kind of legal artifact (e.g., non-disclosure agreements), S205 may function to identify digital artifacts associated with the subscriber's cohort that are of the same kind.

In some embodiments, the clause data, position data, and/or alternative position data may be extracted from the corpus of digital artifacts in similar/analogous ways described previously (which will not be repeated for brevity).

Forming the Context-Sensitive Artifact Review Protocol

Moreover, in some embodiments, establishing a context-sensitive artifact assessment protocol may include forming the context-sensitive artifact review protocol. In one implementation, forming the context-sensitive artifact review protocol may include instantiating a content-storing data structure (e.g., a lookup table, reference table, or the like) and/or may include adding, to the content-storing data structure, a policy (e.g., entry/row) corresponding to each piece of content (clause) extracted from the baseline digital artifact.

In some embodiments, creating a policy for a target piece of content (clause) may include storing, in the policy, a description of the target piece of content (clause), a preferred condition/position for the target piece of content (clause), one or more contingency conditions/positions for the target piece of content (clause), and/or the like. Accordingly, in such embodiments, the context-sensitive artifact assessment protocol may comprise a digital data structure that stores each piece of content (e.g., clause) extracted from the baseline digital artifact, a preferred position/condition for each piece of content (e.g., clause) extracted from the baseline digital artifact, one or more contingency positions/conditions for each piece of content (e.g., clause) extracted from the baseline digital artifact, and/or the like.

Additionally, or alternatively, in a second implementation, forming the context-sensitive artifact review protocol may include training one or more machine learning ensembles based on the preferred positions and/or contingency positions associated with each piece of content extracted from the baseline. In one example of such embodiments, the one or more machine learning ensembles may be trained via a training data decay scheme such that newer conditions/positions associated with a respective piece of content may be prioritized over older conditions/positions associated with a respective piece of content.

2.10 Identifying a Digital Artifact Assessment Request

S210, which includes identifying a digital artifact assessment request, may function to identify or receive a request to assess a target digital artifact based on the context-sensitive artifact assessment protocol established in S205. In some embodiments, a digital artifact assessment request, as generally referred to herein, may relate to a request to programmatically assess content underpinning the target digital artifact (e.g., clause data, provision data, condition/position data, etc.) against the context-sensitive artifact assessment protocol established in S205.

In some embodiments, the digital artifact assessment request may include a digital artifact for which a context-sensitive assessment is being requested. In one example, the digital artifact included in the digital artifact assessment request may relate to an instance of the baseline digital artifact that includes adaptations (revisions) from an external entity. Conversely, in some examples, the digital artifact included in the digital artifact assessment request may relate to a digital artifact that originated from an outside entity, may relate to a digital artifact created by a third-party entity, may relate to a digital artifact that may not be an instance of the baseline digital artifact, and/or the like.

Receiving the Digital Artifact Assessment Request

Figure 3A:
FIGS. 3A-3N illustrates example graphical user interfaces for accelerating a detection and disposition of content anomalies in a target digital artifact in accordance with one or more embodiments of the present application.
Figure 3B:
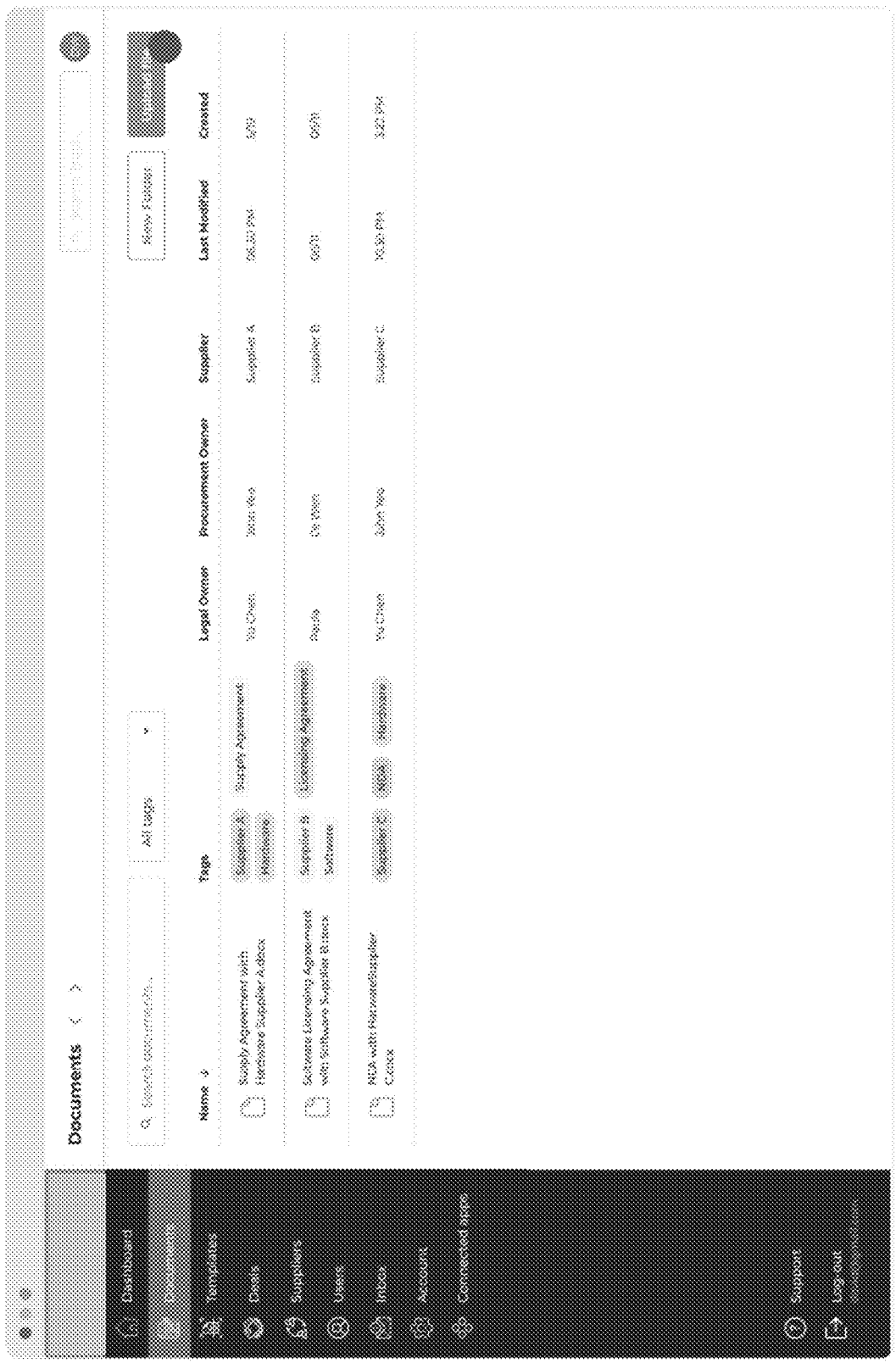
Figure 3C:
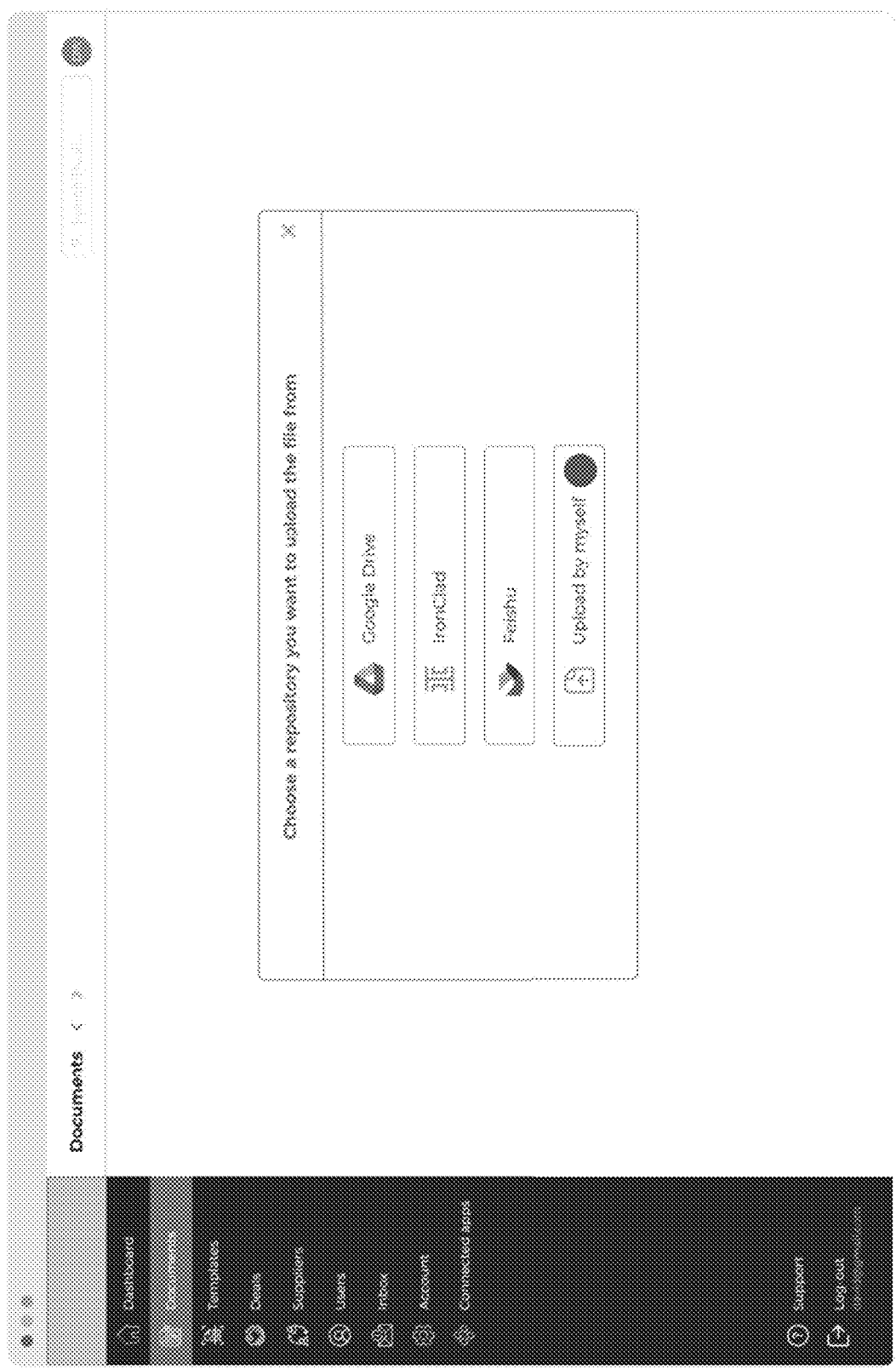
Figure 3D:
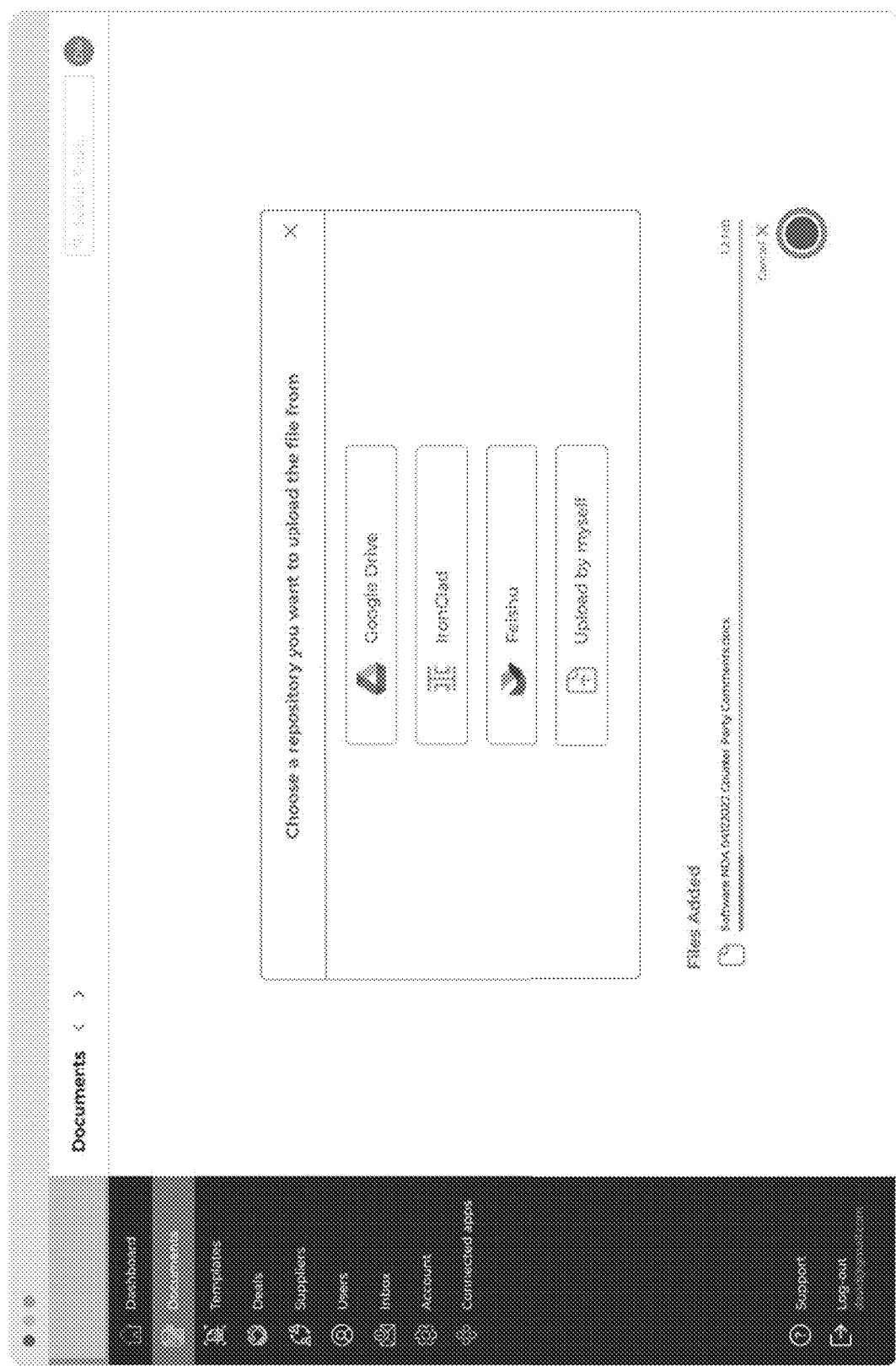
Figure 3E:
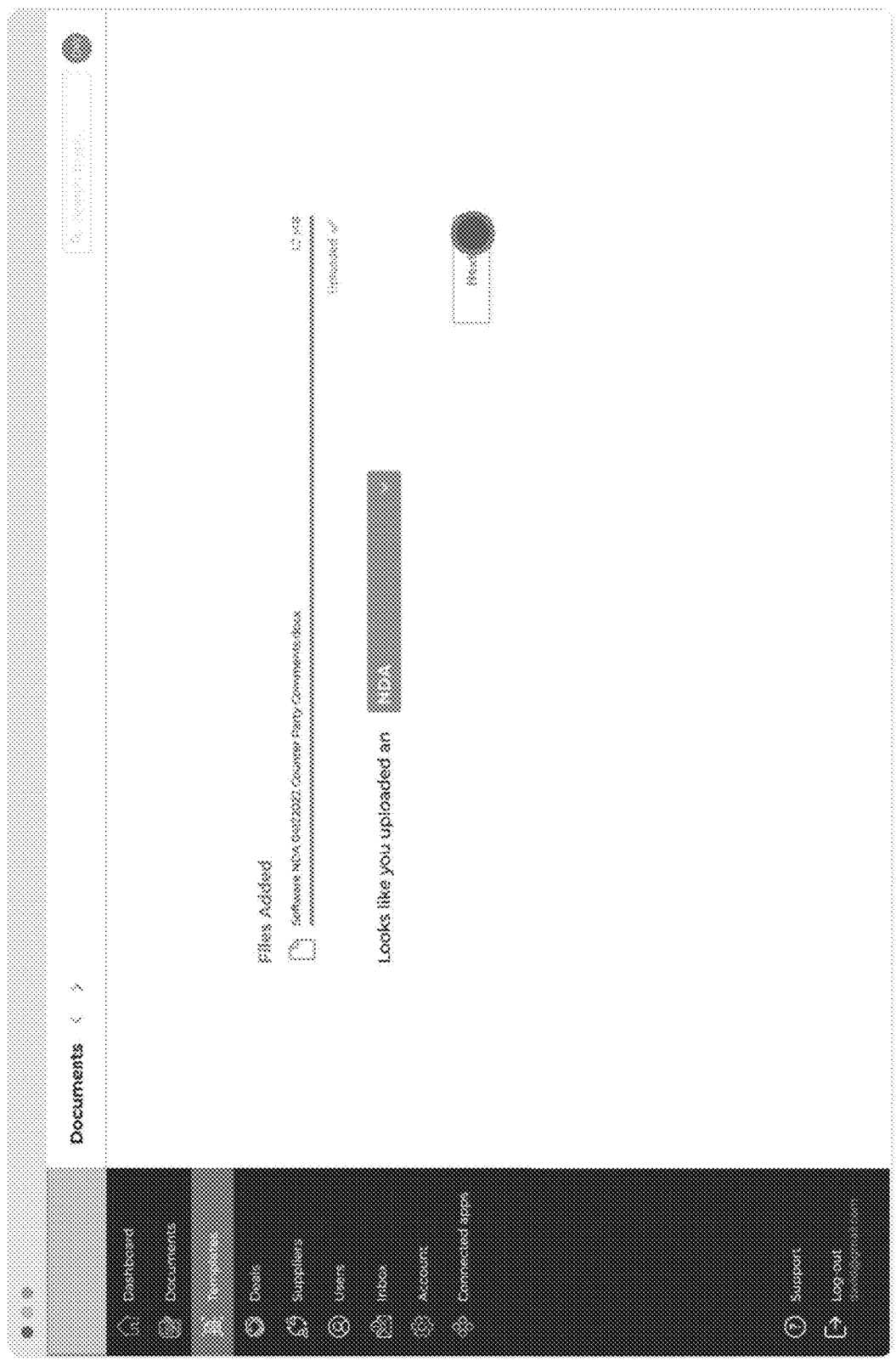
Figure 3F:
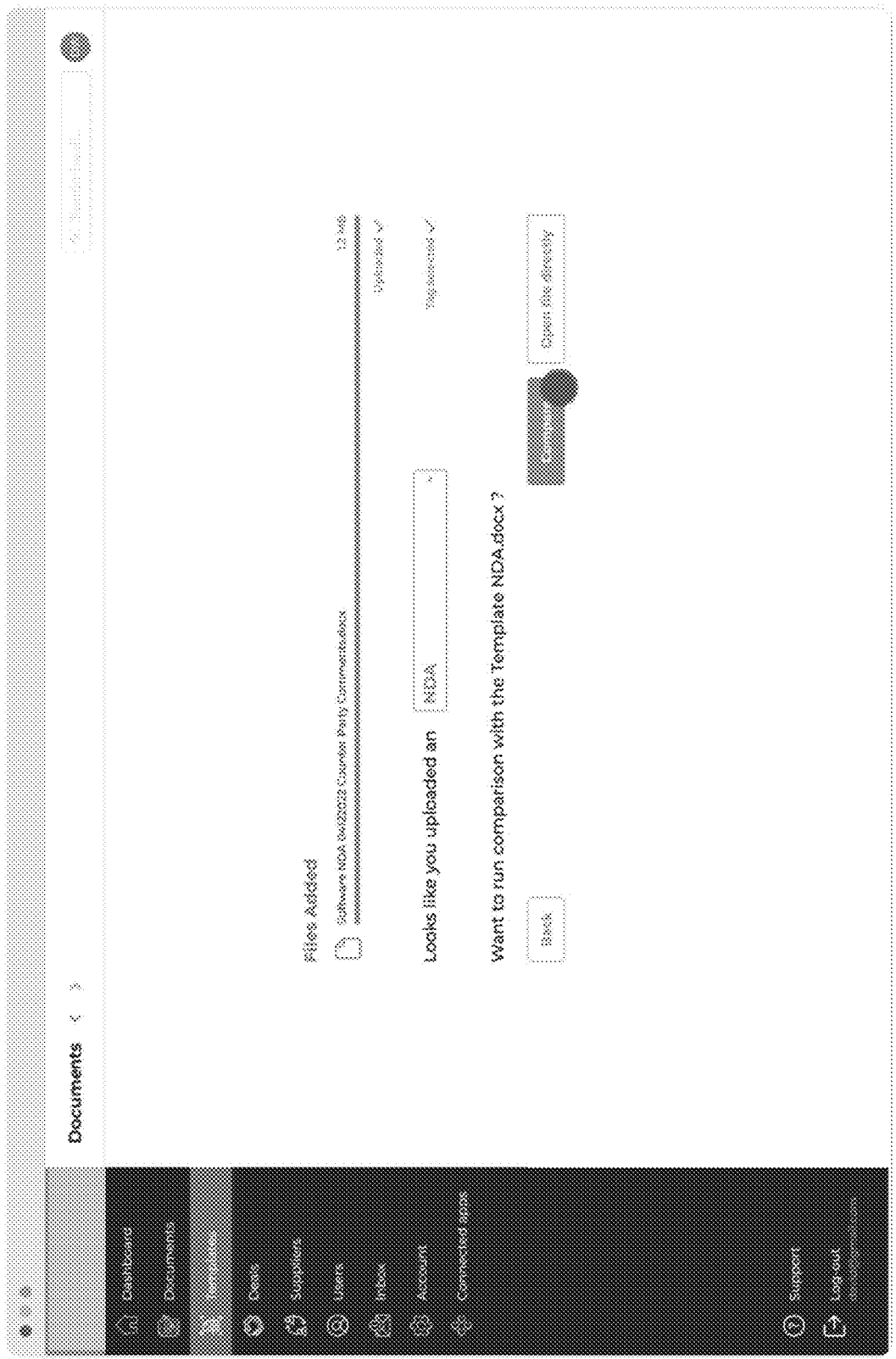
Figure 3G:
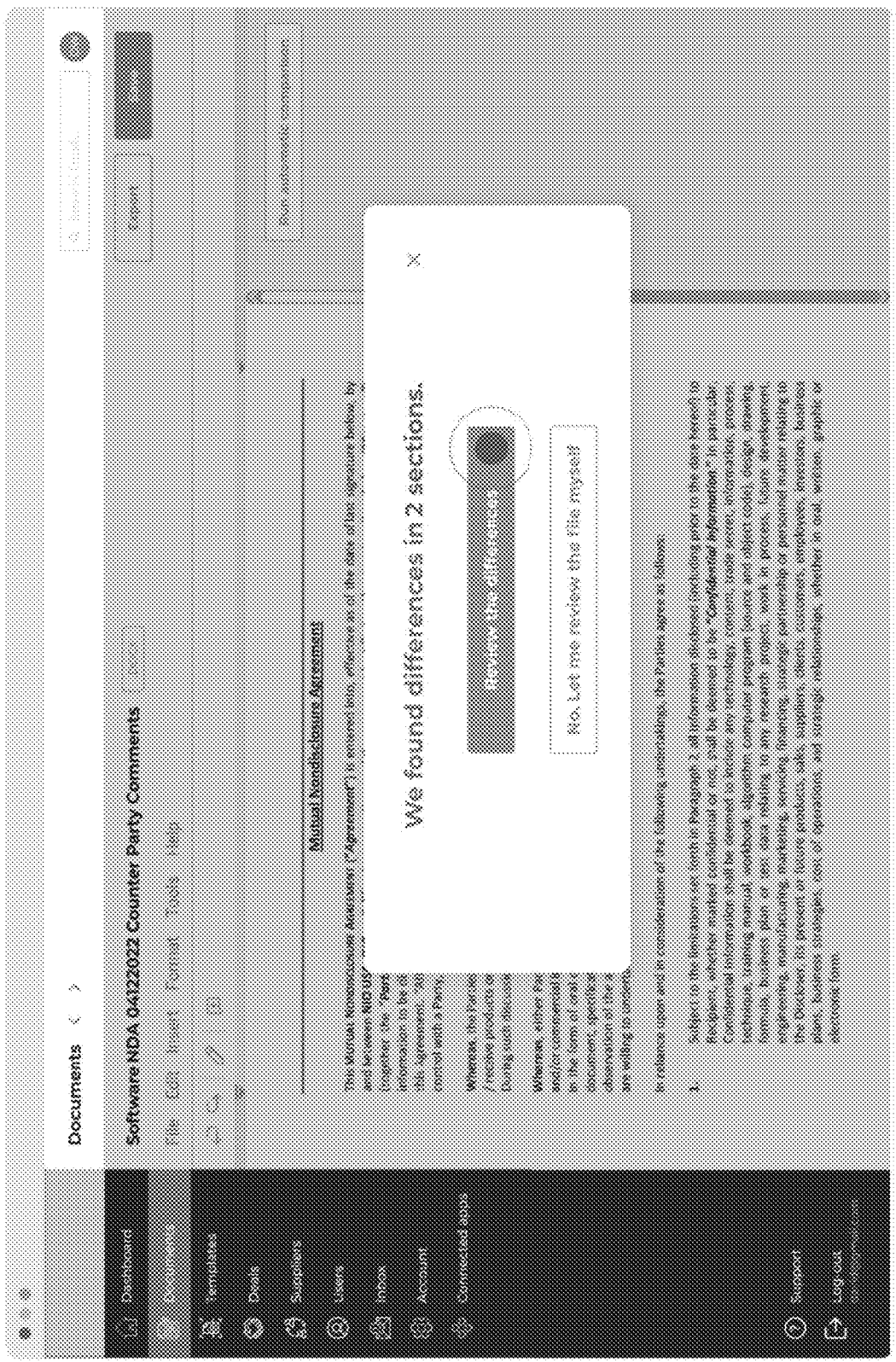
Figure 3H:
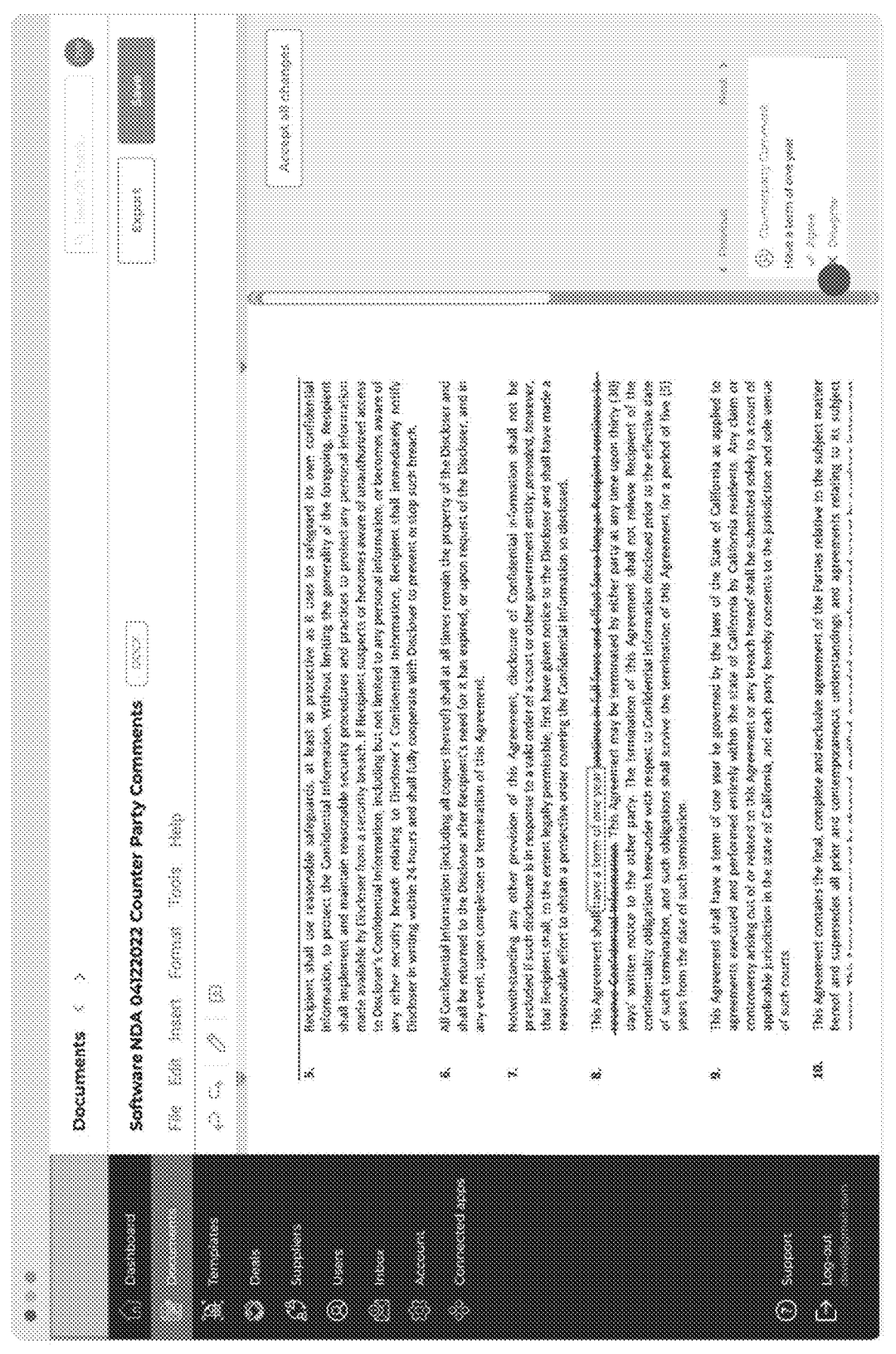
Figure 3I:
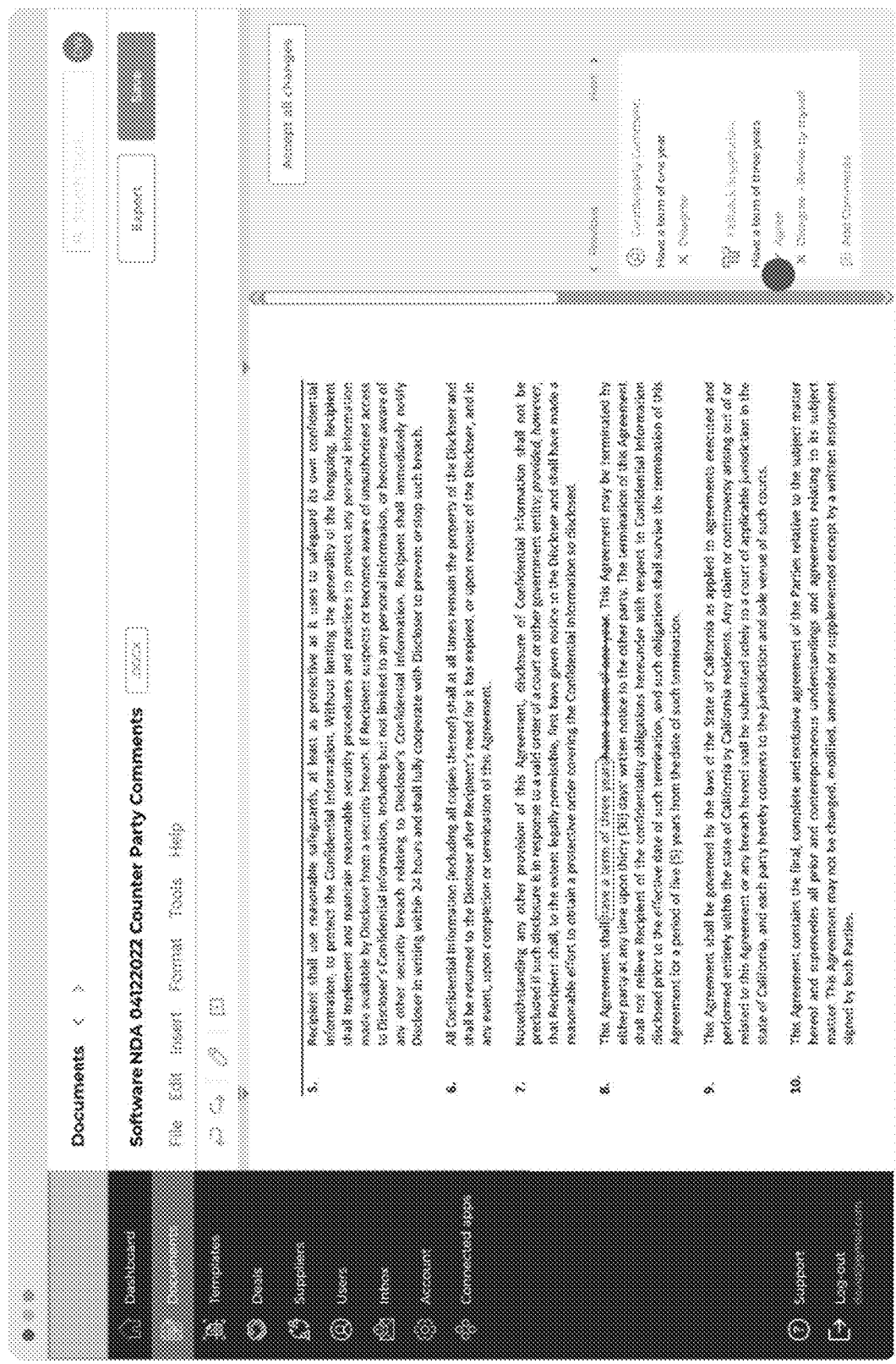
Figure 3J:
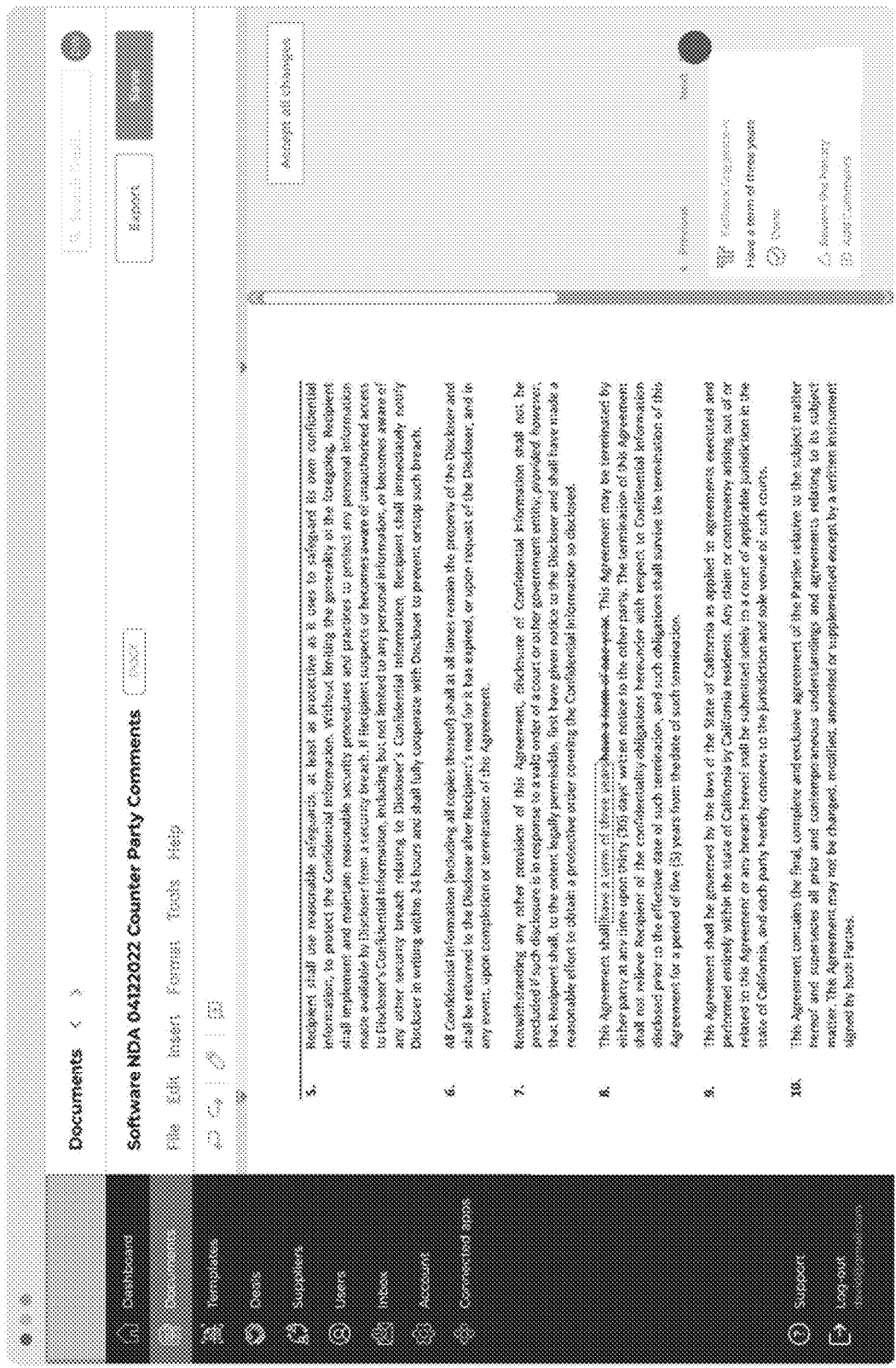
Figure 3K:
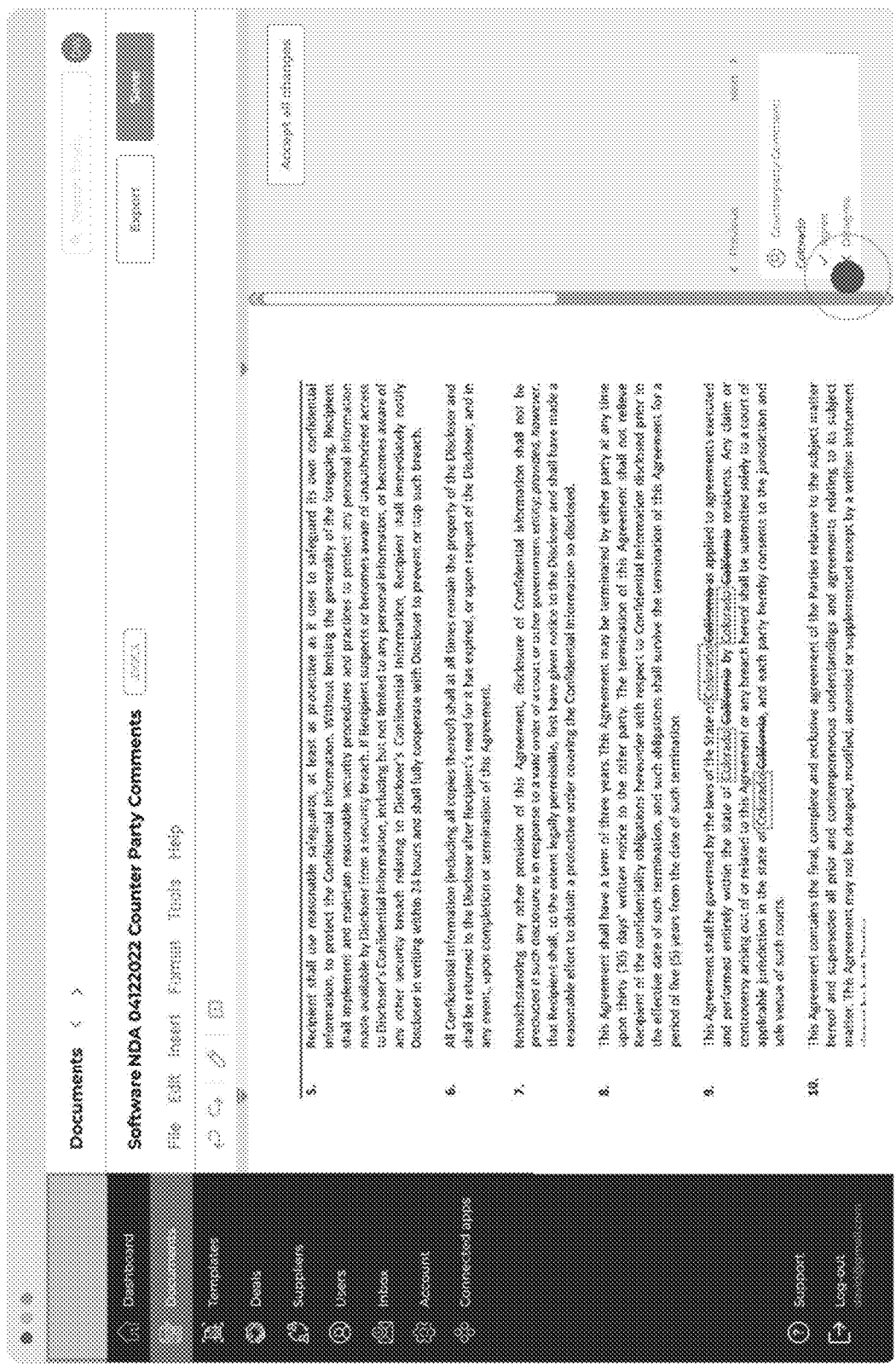
Figure 3L:
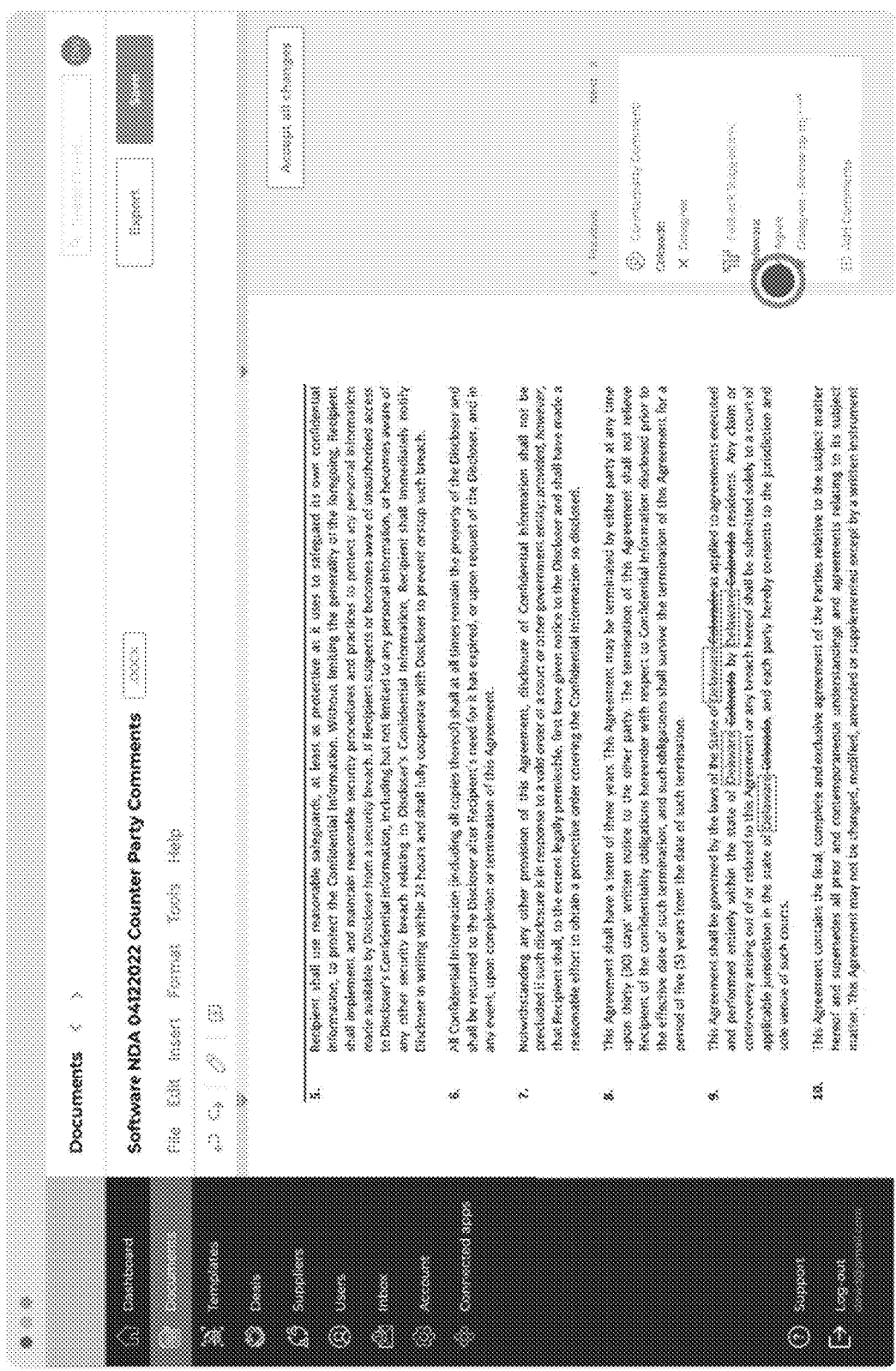
Figure 3M:
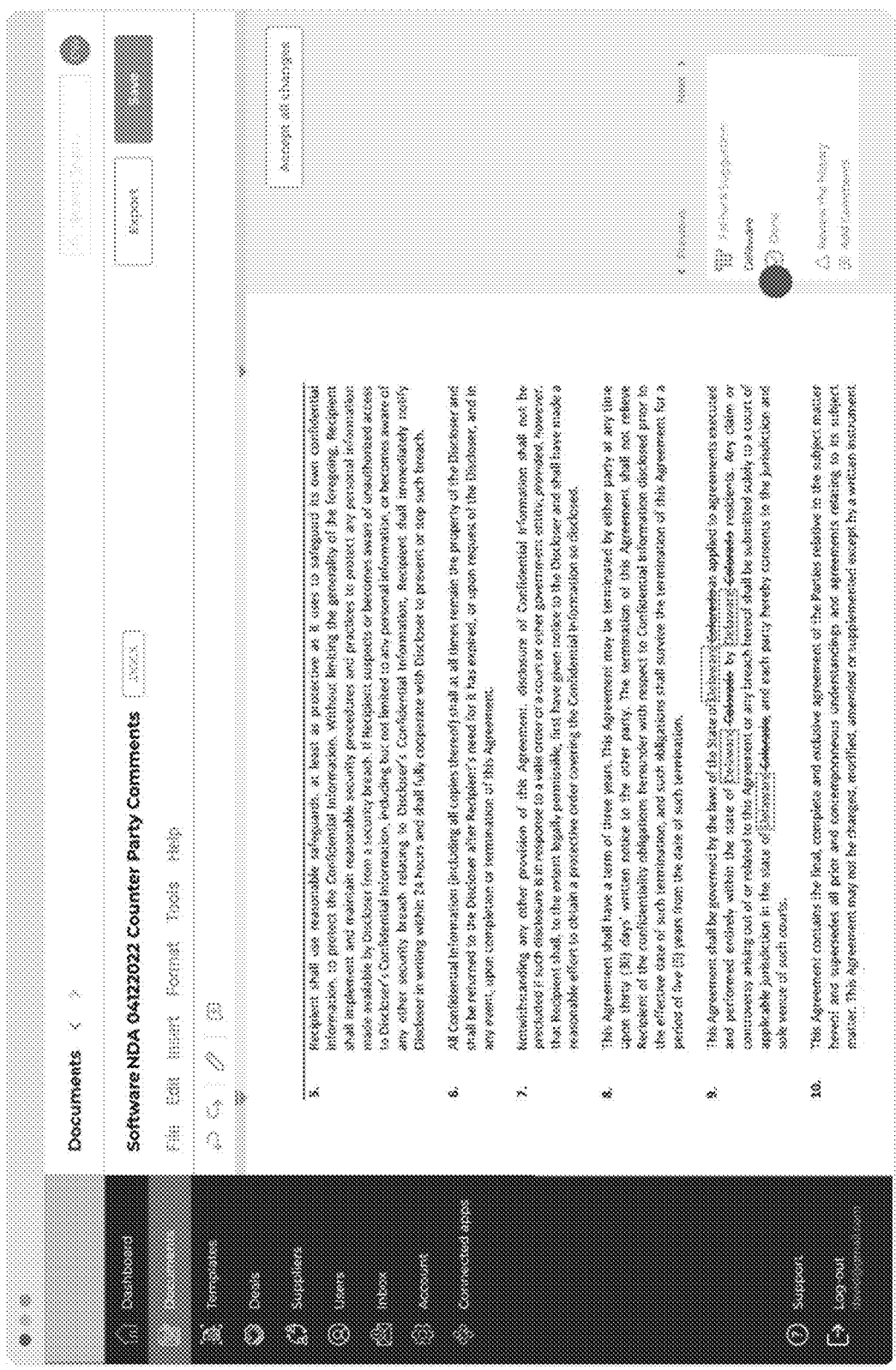
Figure 3N:
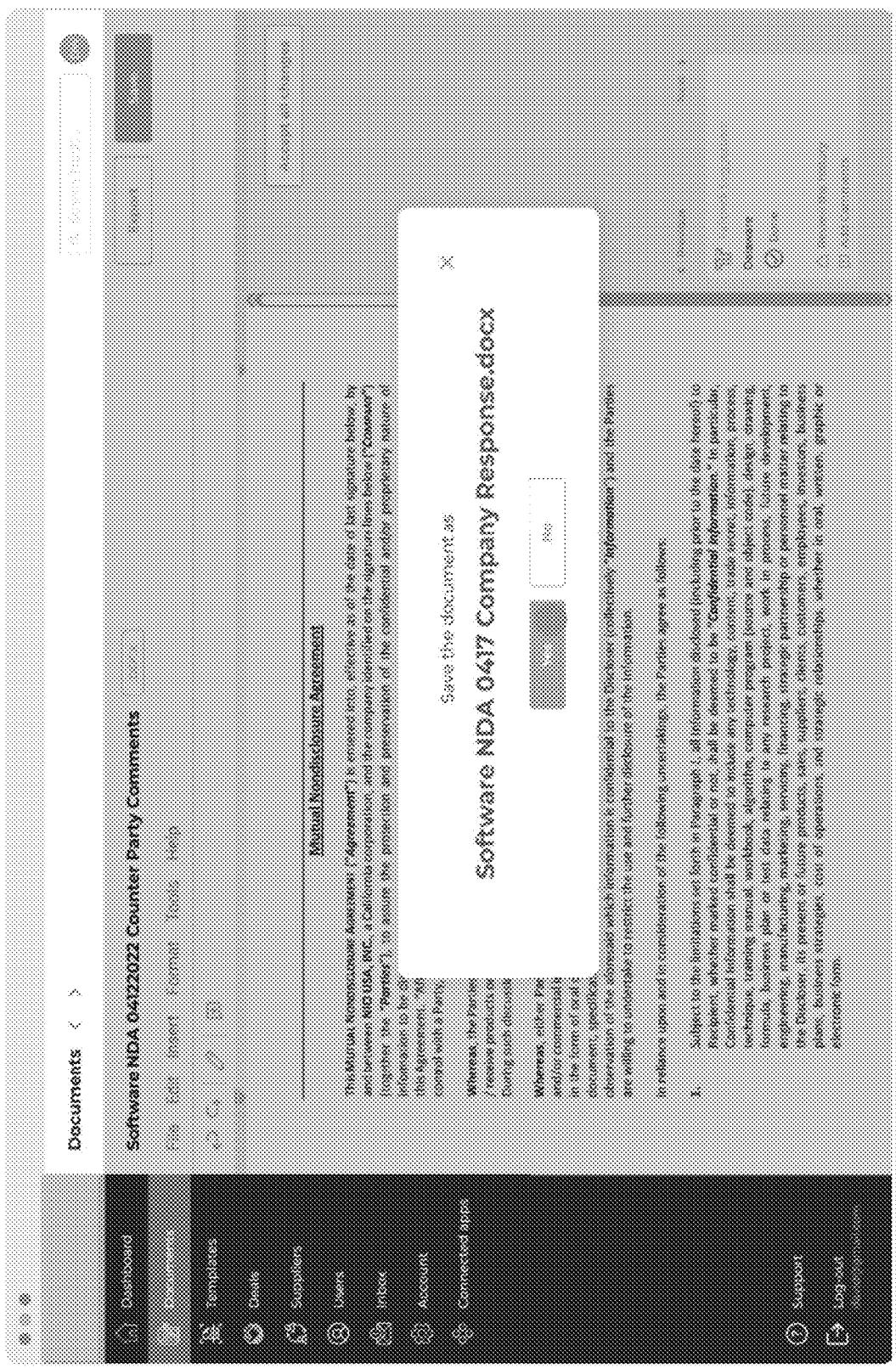

In some embodiments, identifying the digital artifact assessment request may include receiving the digital artifact assessment request from a subscriber subscribing to a system (or service) implementing the method 200 (e.g., a digital artifact assessment service). In one example of such embodiments, as generally illustrated in FIGS. 3A-3N, the digital artifact assessment request may be received via one or more graphical user interfaces (GUIs), one or more command line interfaces (CLIs), and/or one or more application programming interfaces (APIs) that may be specifically configured to allow a subscriber to create a digital artifact assessment request and/or transmit a digital artifact assessment request to a system (or service) implementing the method 200.

2.20 Detecting Content Anomalies

S220, which includes detecting content anomalies, may function to identify contextual differences between a digital artifact underpinning the digital artifact assessment request ("target digital artifact") and a respective context-sensitive artifact assessment protocol. In some embodiments, as will be described in more detail herein, a content anomaly may be detected if at least one piece of content underpinning the target digital artifact recites or includes unexpected content and/or may be detected if S220 detects that the target digital artifact may be missing at least one piece of expected/desired content.

Classifying the Target Digital Artifact

In some embodiments, identifying content anomalies in the target digital artifact may include classifying the target digital artifact to a respective artifact type (or artifact category). In one example of such embodiments, to classify the target digital artifact, S220 may function to provide a feature vector related to the target digital artifact as input into a machine learning-based artifact type classifier. The machine learning-based artifact type classifier may, in turn, function to compute an artifact type inference relating to the type, category, or class associated with the target digital artifact.

For instance, in a non-limiting example, based on S220 providing a feature vector related to the target digital artifact as input into the machine learning-based artifact type classifier, S220 may function to compute an artifact type inference indicating that the target digital artifact relates to a licensing agreement, non-disclosure agreement, master services agreement, supplier agreement, and/or the like.

It shall also be noted that S220 may function to identify the type or category associated with a target digital artifact in other ways without departing from the scope of the inventions contemplated herein, including, but not limited to, determining a type/category associated with a target digital artifact based on a file name of the target digital artifact, determining a type/category associated with a target digital artifact based on a title of the target digital artifact, and/or the like.

Identifying a Context-Sensitive Artifact Assessment Protocol

Furthermore, in some embodiments, identifying content anomalies in the target digital artifact may include identifying a context-sensitive artifact assessment protocol associated with the target digital artifact. In one example, identifying a context-sensitive artifact assessment protocol may include searching a context-sensitive artifact assessment protocol repository for a respective context-sensitive artifact assessment protocol that may relate to a same category/type as the target digital artifact.

In such an example, if the search identifies a context-sensitive artifact assessment protocol matching the category/type of the target digital artifact, S220 may function to return that context-sensitive artifact assessment protocol as a result to search. Conversely, if the search identifies that the context-sensitive artifact assessment protocol repository does not include a context-sensitive artifact assessment protocol relating to the category/type of target digital artifact, S220 may forgo returning a context-sensitive artifact assessment protocol as a result to search.

For instance, in a non-limiting example, if S220 detected that the target digital artifact may relate to non-disclosure agreements, S220 may, in turn, function to search a context-sensitive artifact assessment protocol repository for a context-sensitive artifact assessment protocol that may relate to non-disclosure agreements. If the search identifies that the context-sensitive artifact assessment protocol repository includes a context-sensitive artifact assessment protocol relating to non-disclosure agreements, S220 may function to return that context-sensitive artifact assessment protocol as a result to search. Conversely, if the search identifies that the context-sensitive artifact assessment protocol repository does not include a context-sensitive artifact assessment protocol relating to non-disclosure agreements, S220 may function to return zero context-sensitive artifact assessment protocols as a result to search.

Identifying Target Content Underpinning the Target Digital Artifact

Additionally, or alternatively, in some embodiments, identifying content anomalies in the target digital artifact may include identifying target content underpinning the target digital artifact. In one example of such embodiments, identifying target content underpinning the target digital artifact may include identifying one or more clauses underpinning the target digital artifact, one or more provisions underpinning the target digital artifact, one or positions associated with each provision/clause underpinning the target digital artifact, one or sections underpinning the target digital artifact, and/or the like.

In one example, to identify such target content, S220 may function to implement an automated content search and extraction algorithm. The automated content search and extraction algorithm, in some embodiments, may function to search and extract content from the target digital artifact in analogous ways described with respect to S205 (which will not be repeated for the sake of brevity).

Identifying Missing (Absent) Content

Additionally, or alternatively, in some embodiments, identifying content anomalies in the target digital artifact may include identifying content missing (or absent) from the target digital artifact. In one example of such embodiments, identifying missing/absent content from the target digital artifact may include identifying clauses and/or sections embedded in a respective context-sensitive artifact assessment protocol that may be absent/missing from the target digital artifact (e.g., the context-sensitive artifact assessment protocol returned from the search).

In one implementation of such an example, S220 may function to enumerate the clause and/or section data underpinning the respective context-sensitive artifact assessment protocol and, in turn, identify each clause and/or section embedded in the respective context-sensitive artifact assessment protocol that may not be included in the results returned from the automated content search and extraction algorithm.

Assessing Positions/Conditions Underpinning the Target Digital Artifact

Additionally, or alternatively, in some embodiments, identifying content anomalies in the target digital artifact may include assessing whether each position/condition returned from the automated content search and extraction algorithm may be acceptable. In one example of such embodiments, to assess whether a target position/condition underpinning the target digital artifact may be acceptable, S220 may function to identify, in the target detail artifact, a clause/provision comprising such position/condition and, in turn, identify whether an entry, in the context-sensitive artifact assessment protocol, corresponding to that respective clause/provision includes the target position/condition as a "preferred" position/condition or a "fallback" position/condition.

Accordingly, in such an example, if the entry corresponding to that respective clause/provision indicates that the target position/condition as a "preferred" position/condition or a "fallback" position/condition, S220 may function to determine that that the target position/condition may be acceptable (e.g., not anomalous). Conversely, in some embodiments, if the entry corresponding to that respective clause/provision does not indicate the target position/condition as a "preferred" position/condition or a "fallback" position/condition, S220 may function to determine that that the target position/condition may not be acceptable (e.g., anomalous).

2.30 Generating a Digital Artifact Assessment User Interface

S230, which includes generating a digital artifact assessment user interface, may function to create or build a graphical user interface that may surface anomalies detected in the target digital artifact (as generally illustrated in FIGS. 3A-3N). In some embodiments, the digital artifact assessment user interface, once generated by S230, may be displayed to the subscriber and/or may enable the subscriber to efficiently identify and resolve content anomalies detected in the target digital artifact.

Installing a Digital Representation of the Target Digital Artifact

In some embodiments, generating the digital artifact assessment user interface, may include installing, in a first section of the digital artifact assessment user interface, a digital representation of the target digital artifact. In one example of such embodiments, the first section of the digital artifact assessment user interface may be scrollable and, when scrolled, may cause the digital artifact assessment user interface to display different portions of the target digital artifact.

Furthermore, in some embodiments, the digital representation of the target digital artifact may visually display at least a portion of the content underpinning the target digital artifact, such as the section data underpinning the target digital artifact, the clause data underpinning the target digital artifact, the provision data underpinning the target digital artifact, the position/condition data underpinning the target digital artifact, and/or the like. Moreover, in some embodiments, the digital representation of the target digital artifact may additionally, or alternatively, emphasize third-party adaptations made to the target digital artifact (if such third-party adaptations exist).

In some examples, displaying the third-party adaptations within the digital representation of the target digital artifact may include displaying content removed (or deleted) by an external party with a strikethrough typographical presentation. Similarly, in some examples, displaying the third-party adaptations within the digital representation of the target digital artifact may include displaying content added by an external party with an underline typographical presentation. It shall be noted that the above examples are not intended to be limiting and that other typographical presentation schemes may be utilized to emphasize third-party adaptations without departing from the scope of the inventions contemplated herein.

Adaptation Discovery User Interface Element

Additionally, or alternatively, in some embodiments, generating the digital artifact assessment user interface may include displaying an adaptation discovery user interface element for each third-party adaptation underpinning the target digital artifact. It shall be noted that, in some embodiments, if S230 determines that the target digital artifact does not include any third-party adaptations, the digital artifact assessment user interface may forgo displaying such user interface elements.

In some embodiments, the adaptation discovery user interface element displayed for a target adaptation may include a text label that indicates the adaptation made by the external entity and/or may include a plurality of selectable options. In one example of such embodiments, the plurality of selectable options may include a first selectable option that, when selected, accepts the target adaptation and updates the target digital artifact accordingly. Additionally, or alternatively, in a second example of such embodiments, the plurality of selectable options may include a second selectable option that, when selected, rejects the target adaptation and modifies the target digital artifact accordingly.

Proposing Counter Positions for External Adaptations

Furthermore, in some embodiments, upon rejecting a target adaptation, S230 may function to propose one or more counter positions for the target adaptation. In one example of such embodiments, proposing one or more counter positions for the target adaptation may include identifying a provision/clause associated with the target adaptation. For instance, in a non-limiting example, S230 may function to determine that the target adaptation may be associated with a financial clause, a liability clause, a confidentiality clause, a termination clause, a dispute resolution clause, a damages clause, a jurisdiction clause, and/or the like.

Additionally, or alternatively, in some embodiments, proposing one or more counter positions for the target adaptation may include identifying, an entry, in the target context-sensitive assessment protocol, corresponding to the provision/clause associated with the target adaptation. For instance, in a non-limiting example, if S230 determines that the target adaptation is associated with a first clause type (e.g., a financial clause), S230 may function to locate, in the target context-sensitive assessment protocol, an entry to corresponding to the first clause type (e.g., the financial clause). Conversely, in a second non-limiting example, if S230 determines that the target adaptation is associated with a second clause type (e.g., a confidentiality clause), S230 may function to locate, in the target context-sensitive assessment protocol, an entry to corresponding to the second clause type (e.g., the confidentiality clause).

Moreover, in some embodiments, proposing one or more counter positions for the target adaptation may include extracting, from the identified entry, the preferred position related to that clause (and/or the alternative positions) related to that clause and, in turn, recommending the preferred position (and/or the alternative positions) to the subscriber.

In some embodiments, these identified counter positions may be proposed to the subscriber one-at-a-time until the subscriber "accepts" one of the counter positions (or until no more counter positions are available for display). In some embodiments, the order in which the one or more counter positions are displayed may be based on different recommendation techniques, including, but not limited to, content-based methods/techniques (e.g., positions that more closely relate to the subscriber's responsibility are displayed before positions that are less likely to relate to the subscriber's responsibilities), collaborative filtering techniques/methods (e.g., positions are recommended based on behaviors of multiple subscribers), reinforcement learning methods/techniques (e.g., positions are recommended based on whether a position was accepted in the past), and/or the like. For instance, in a non-limiting example, if a subscriber's product/service is mission-critical to an external entity (e.g., counterparty), S230 may function to suggest fallback positions based on this knowledge, such as by suggesting that the counterparty pay for the total license and maintenance fees in the liability clause.

It shall be noted that, in some embodiments, when a subscriber accepts a counter position, S230 may function to remove (e.g., delete) the third party adaptation from the target digital artifact and insert, in its place, the accepted counter position. It shall be noted that, in some examples, this insertion and/or deletion may be indicated according to the same (or similar) typographical presentation scheme described previously (or according to a different typographical presentation scheme).

Content Anomaly User Interface Element

Additionally, or alternatively, in some embodiments, generating the digital artifact assessment user interface may include installing, in the digital artifact user interface, a content anomaly user interface element for each content anomaly detected in S220. It shall be noted that, in some embodiments, if S220 determined that the target digital artifact does not include any content anomalies, the digital artifact assessment user interface may forgo displaying such user interface elements.

In some embodiments, the content anomaly user interface element displayed for a target anomaly may include a proposal for resolving the target anomaly and/or may include a plurality of selectable options. In one example of such embodiments, the plurality of selectable options may include a first selectable option that, when selected, accepts the proposal for resolving the target anomaly and updates the target digital artifact accordingly. Additionally, or alternatively, in a second example of such embodiments, the plurality of selectable options may include a second selectable option that, when selected, rejects the proposal for resolving the target anomaly.

It shall be noted that, in some embodiments, the proposal indicated in the content anomaly user interface element may have been identified, by S230, in one or more analogous ways described above with respect to third party adaptations. Furthermore, it shall also be noted that, in some embodiments, if a subscriber rejects the proposal for resolving the target anomaly, S230 may function to display one or more other proposals for resolving the target anomaly in analogous ways described with respect to third party adaptations.

2.40 Outputting a Succeeding Digital Artifact

S240, which includes outputting a succeeding digital artifact, may function to produce a downloadable digital artifact that may include adaptations a subscriber made to the target digital artifact in S230. In some embodiments, the succeeding digital artifact may be produced/generated in response to (e.g., based on) a subscriber selecting a 'download' and/or a 'save' user interface element in the digital artifact assessment user interface.

In some embodiments, outputting a succeeding digital artifact, may include outputting the digital artifact modified in S230 to any suitable file type/format, including, but not limited to, a '.doc' file format, a '.pdf file format, a'.txt' file format, a '.odt' file format, a '.docx' file format, and/or the like.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

Although omitted for conciseness, the preferred embodiments may include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A machine learning-based method for accelerating a detection and disposition of content anomalies in a target digital artifact, the method comprising:
   identifying, by one or more computers, a digital artifact associated with a digital artifact assessment request;
   classifying the digital artifact to a distinct category of the digital artifact of a plurality of possible artifact categories based on features extracted from the digital artifact;
   obtaining, from a context-sensitive artifact assessment protocol repository, a context-sensitive artifact assessment protocol digitally mapped to the distinct category of the digital artifact, wherein the context-sensitive artifact assessment protocol comprises a content-storing data structure storing machine learning-derived policy entries corresponding to different clauses extracted from a baseline digital artifact relating to the distinct category of the digital artifact, wherein the obtaining includes:
      using the distinct category of the digital artifact to execute a search of the content-sensitive artifact assessment protocol repository,
      identifying a match between the distinct category of the digital artifact and a category of the context-sensitive artifact assessment protocol within the context-sensitive artifact assessment protocol repository, and
      returning the context-sensitive artifact assessment protocol based on identifying the match for the search;
   detecting, via the one or more computers, a plurality of content deviations in the target digital artifact based on the context-sensitive artifact assessment protocol obtained from the context-sensitive artifact assessment protocol repository;
   identifying, via a digital artifact assessment user interface, a sequence of one or more inputs corresponding to an acceptance of a first subset of the plurality of content deviations and a rejection of a second subset of the plurality of content deviations;
   based on identifying the acceptance of the first subset of the plurality of content deviations:
      (A) digitally accepting the first subset of content deviations in the digital artifact; and
      (B) graphically indicating, to a subscriber, that the first subset of the plurality of content deviations have been digitally accepted based on a predefined typographical presentation scheme; and
   based on identifying the rejection of the second subset of the plurality of content deviations:
      (I) digitally rejecting the second subset of the plurality of content deviations in the target digital artifact;
      (II) graphically indicating, to the subscriber, that the second subset of the plurality of content deviations have been digitally rejected based on the predefined typographical presentation scheme;
      (III) computing, via the one or more computers, a system-generated adaptation proposal for each content deviation underpinning the second subset of the plurality of content deviations based on machine learning-derived policies underpinning the context-sensitive artifact assessment protocol; and
      (IV) graphically indicating, to the subscriber, the system-generated adaptation proposal computed for each content deviation underpinning the second subset of the plurality of content deviations.

2. The method of claim 1, wherein graphically indicating the system-generated adaptation proposal includes:
   displaying, to the subscriber, an adaptation discovery user interface element corresponding to the system-generated adaptation proposal, wherein:
      (a) the adaptation discovery user interface element includes a textual representation of the system-generated adaptation proposal,
      (b) the adaptation discovery user interface element includes a first selectable option that, when selected, causes a subject content deviation to be replaced with the system-generated adaptation proposal, and
      (c) the adaptation discovery user interface element includes a second selectable option that, when selected, rejects the system-generated adaptation proposal.

3. The method of claim 2, wherein rejecting the system-generated adaptation proposal includes forgoing replacing the subject content deviation with the system-generated adaptation proposal, the method further comprising:
   identifying, by one or more computers, a second input selecting the second selectable option;
   based on identifying the second input:
      computing, via one or more computers, one or more additional system-generated adaptation proposals for the subject content deviation based on the machine learning-derived policies underpinning the context-sensitive artifact assessment protocol; and
      sequentially displaying, to the subscriber, the one or more additional system-generated adaptation proposals until the subscriber accepts one of the one or more additional system-generated adaptation proposals; and
   based on the subscriber accepting one of the one or more additional system-generated adaptation proposals:
      digitally replacing the subject content deviation with the one of the one or more additional system-generated proposals in accordance with the predefined typographical presentation scheme.

4. The method of claim 1, further comprising:
   constructing the context-sensitive artifact assessment protocol repository, wherein constructing the context-sensitive artifact assessment protocol repository includes:
      constructing a plurality of context-sensitive artifact assessment protocols based on a plurality of distinct baseline digital artifacts associated with the subscriber; and
      embedding the plurality of context-sensitive artifact assessment protocols in the context-sensitive artifact assessment protocol repository.

5. The method of claim 4, wherein:
   constructing the plurality of context-sensitive artifact assessment protocols includes constructing the context-sensitive artifact assessment protocol, and constructing the context-sensitive artifact assessment protocol includes:
identifying, via one or computers, a baseline digital artifact for the distinct category of the digital artifact;
identifying, via one or more automated search heuristics, one or more provision underpinning in the baseline digital artifact;
identifying, via the one or more automated search heuristics, a contract condition underpinning the one or more provisions in the baseline digital artifact;
identifying, via one or more computers, one or more alternative contract conditions for the one or more provisions defined in the baseline digital artifact based on an evaluation of a plurality of distinct instances of the baseline digital artifact; and
embedding, in the context-sensitive artifact assessment protocol, a machine learning-derived policy for the one or more provisions underpinning the baseline digital artifact.

6. The method of claim 5, wherein:
a machine learning-derived policy for a subject provision of the one or more provisions in a baseline digital artifact defines a subscriber preferred position associated with the subject provision,
the machine learning-derived policy for the subject provision defines one or more subscriber-accepted alternative positions associated with the subject provision,
the subscriber preferred position corresponds to the contract condition identified as underpinning the subject provision, and
the one or more subscriber-accepted alternative positions correspond to one or more alternative contract conditions identified for the subject provision in a plurality of distinct instances of the baseline digital artifact.

7. The method of claim 1, wherein detecting the plurality of content deviations based on the context-sensitive artifact assessment protocol includes:
(a) detecting one or more adversarial conditions in the target digital artifact based on machine learning-derived policies underpinning the context-sensitive artifact assessment protocol, wherein the one or more adversarial conditions relate to an adaptation entry that does not indicate that a subject third-party adaptation comprises a subscriber-preferred position of a clause or an alternative position of a clause.

8. The method of claim 7, wherein detecting the plurality of content deviations based on the context-sensitive artifact assessment protocol further includes:
(b) detecting that one or more expected pieces of content is missing from the target digital artifact based on the machine learning-derived policies underpinning the context-sensitive artifact assessment protocol.

9. A machine learning-based method for accelerating a detection and disposition of content anomalies in a target digital artifact, the method comprising:
identifying a digital artifact assessment request from a subscriber, wherein the digital artifact assessment request (a) comprises a target digital artifact and (b) is identified based on the subscriber uploading the target digital artifact to a digital artifact assessment service;
based on identifying the digital artifact assessment request:
computing an artifact classification inference for the target digital artifact based on an input of features extracted from the target digital artifact, wherein the artifact classification inference includes a predicted likelihood that the target digital artifact classifies to a category of digital artifact of a plurality of distinct artifact categories;
searching a context-sensitive artifact assessment protocol repository for a context-sensitive artifact assessment protocol that is digitally associated with the category of digital artifact based on the artifact classification inference, wherein the context-sensitive artifact assessment protocol comprises a content-storing data structure storing machine learning-derived policy entries corresponding to different clauses extracted from a baseline digital artifact relating to the distinct category of the digital artifact, wherein the searching includes:
using the category of the digital artifact to execute a search of the content-sensitive artifact assessment protocol repository,
identifying a match between the category of the digital artifact and a category of the context-sensitive artifact assessment protocol within the context-sensitive artifact assessment protocol repository, and
returning the context-sensitive artifact assessment protocol based on identifying the match for the search, wherein the context-sensitive artifact assessment protocol;
detecting, based on the context-sensitive artifact assessment protocol, a plurality of content deviations in the target digital artifact, wherein the detecting includes:
(i) detecting one or more adversarial conditions in the target digital artifact based on machine learning-derived policies underpinning the context-sensitive artifact assessment protocol, wherein the one or more adversarial conditions relate to an adaptation entry that does not indicate that a subject third-party adaptation comprises a subscriber-preferred position of a clause or an alternative position of a clause; and
(ii) detecting one or more expected pieces of content missing from the target digital artifact based on the machine learning-derived policies underpinning the context-sensitive artifact assessment protocol; and
generating a digital artifact assessment user interface based on the plurality of content deviations detected in the target digital artifact, wherein generating the digital artifact assessment user interface includes:
(1) generating a digital representation of the target digital artifact, wherein the digital representation of the target digital artifact is scrollable to display different portions of the target digital artifact; and
(2) generating a content anomaly user interface element for each content deviation detected in the target digital artifact, wherein the content anomaly user interface element includes a first selectable option for accepting a target content deviation and a second selectable option for denying the target content deviation;
identifying a sequence of subscriber inputs corresponding to an acceptance of a first subset of content deviations of the plurality of content deviations and a denial of a second subset of content deviations of the plurality of content deviations;
based on identifying the acceptance of the first subset of content deviations:
(A) digitally accepting the first subset of content deviations in the target digital artifact; and
(B) graphically indicating, in the digital artifact assessment user interface, that the first subset of content deviations has been digitally accepted based on a predefined typographical presentation scheme; and based on identifying the denial of the second subset of content deviations:

(I) digitally rejecting the second subset of content deviations in the target digital artifact;

(II) graphically indicating, in the digital artifact assessment user interface, that the second subset of content deviations has been digitally rejected based on the predefined typographical presentation scheme;

(III) computing a system-generated adaptation proposal for each content deviation underpinning the second subset of content deviations based on the machine learning-derived policies underpinning the context-sensitive artifact assessment protocol;

(IV) generating an adaptation discovery user interface element for each content deviation underpinning the second subset of content deviations, wherein the adaptation discovery user interface element, once generated, at least includes:

(III-a) a textual representation of the system-generated adaptation proposal computed for a subject content deviation;

(III-b) a first respective selectable option for accepting the system-generated adaptation proposal that, when selected, causes the system-generated adaptation proposal to be digitally inserted into the target digital artifact according to the predefined typographical presentation scheme; and (III-c) a second respective selectable option for rejecting the system-generated adaptation proposal that, when selected, causes one or more additional system-generated adaptation proposals to be generated for the subject content deviation, wherein the one or more additional system-generated adaptation proposals are generated based on the machine learning-derived policies underpinning the context-sensitive artifact assessment protocol.

10. The method of claim 9, wherein:
the target digital artifact comprises a transactional artifact,
the artifact classification inference is computed via a machine learning-based artifact classifier,
the machine learning-based artifact classifier is configured to classify the target digital artifact to one of the plurality of distinct artifact categories, and
classifying the target digital artifact to one of the plurality of distinct artifact categories includes classifying the target digital artifact to one of a licensing agreement, a non-disclosure agreement, a master services agreement, and a supplier agreement.

11. The method of claim 9, wherein:
the target digital artifact comprises a transactional artifact,
the target digital artifact comprises an instance of a baseline digital artifact associated with the subscriber,
the target digital artifact includes adaptations made by an external party, and
detecting the one or more adversarial conditions in the target digital artifact includes:
identifying a plurality of third-party adaptations in the target digital artifact;
for each third-party adaptation of the plurality of third-party adaptations:
identifying a clause in the target digital artifact comprising a subject third-party adaptation;
identifying a machine learning-based policy underpinning the context-sensitive artifact assessment protocol that corresponds to the clause;
determining that the subject third-party adaptation is not adversarial if the machine learning-based policy indicates that the subject third-party adaptation comprises a preferred position of the clause, wherein the preferred position relates to content desired by a subscriber; and
determining that the subject third-party adaptation is adversarial if the machine learning-based policy does not indicate that the subject third-party adaptation comprises one of the preferred positions associated with the clause.

12. The method of claim 11, wherein detecting the one or more adversarial conditions in the target digital artifact further includes:
for each third-party adaptation of the plurality of third-party adaptations:
determining that the subject third-party adaptation is not adversarial if the machine learning-based policy indicates that the subject third-party adaptation comprises a contingency position of the clause; and
determining that the subject third-party adaptation is adversarial if the machine learning-based policy does not indicate the subject third-party adaptation comprises one of the contingency positions associated with the clause.

13. The method of claim 9, further comprising:
identifying a second sequence of subscriber inputs corresponding to an acceptance of at least one of the additional system-generated adaptation proposals generated for each of the content deviations underpinning the second subset of content deviations;
based on identifying the acceptance of at least one of the additional system-generated adaptation proposals:
(A) digitally inserting the at least one of the additional system-generated adaptation proposals in the target digital artifact
(B) graphically indicating, in the digital artifact assessment user interface, that the at least one of the additional system-generated adaptation proposals has been digitally inserted based on the predefined typographical presentation scheme; and
outputting a succeeding instance of the target digital artifact based on (1) digitally inserting the at least one of the additional system-generated adaptation proposals and (2) digitally accepting the first subset of content deviations.

14. The method of 9, further comprising:
constructing the context-sensitive artifact assessment protocol repository, wherein constructing the context-sensitive artifact assessment protocol repository includes:
constructing a plurality of context-sensitive artifact assessment protocols based on identifying a plurality of distinct baseline digital artifacts associated with the subscriber; and
embedding the plurality of context-sensitive artifact assessment protocols in the context-sensitive artifact assessment protocol repository.

15. The method of claim 9, further comprising:
displaying the digital artifact assessment user interface, wherein displaying the digital artifact assessment user interface includes:
displaying the content anomaly user interface element generated for a subject content deviation in association with a location of the subject content deviation in the digital representation of the target digital artifact.

16. The method of claim 9, wherein the features extracted from the target digital artifact at least include:
(1) a file name of the target digital artifact,
(2) a title of the target digital artifact,
(3) each section defined in the target digital artifact,
(4) each clause defined in the target digital artifact, and
(5) each provision defined in the target digital artifact.

* * * * *